US010249156B2

(12) United States Patent
Shin et al.

(10) Patent No.: US 10,249,156 B2
(45) Date of Patent: Apr. 2, 2019

(54) METHOD FOR PROVIDING HAPTIC EFFECT AND ELECTRONIC DEVICE THERERFOR

(71) Applicant: Samsung Electronics Co., Ltd., Gyeonggi-do (KR)

(72) Inventors: Dongjae Shin, Gyeonggi-do (KR); Kyungtae Kim, Gyeonggi-do (KR); Sun-Kee Lee, Gyeonggi-do (KR); Yo-Han Lee, Gyeonggi-do (KR); Eun Jung Hyun, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/807,960

(22) Filed: Nov. 9, 2017

(65) Prior Publication Data
US 2018/0130318 A1    May 10, 2018

(30) Foreign Application Priority Data

Nov. 10, 2016 (KR) .................. 10-2016-0149524

(51) Int. Cl.
*G08B 6/00* (2006.01)
*G06F 1/16* (2006.01)
*G06F 3/01* (2006.01)

(52) U.S. Cl.
CPC .............. *G08B 6/00* (2013.01); *G06F 1/163* (2013.01); *G06F 3/011* (2013.01); *G06F 3/016* (2013.01)

(58) Field of Classification Search
CPC .... G06F 3/016; G06F 1/163; G06F 2203/014; D03D 1/0088

(Continued)

(56) References Cited

U.S. PATENT DOCUMENTS 6,714,213 B1 * 3/2004 Lithicum ................ G06T 17/00
715/701
8,754,758 B1    6/2014 Ullrich et al.
(Continued)

FOREIGN PATENT DOCUMENTS

EP    2 763 000 A2    8/2014
EP    2 933 709 A2    10/2015
(Continued)

OTHER PUBLICATIONS

European Search Report dated Feb. 6, 2018.
European Search Report dated Dec. 20, 2018.

*Primary Examiner* — Fabricio R Murillo Garcia
(74) *Attorney, Agent, or Firm* — Cha & Reiter, LLC.

(57) ABSTRACT

Disclosed are an apparatus and a method for providing a haptic effect in an electronic device. The electronic device includes at least one sensor, at least one processor, and a memory electrically coupled to the at least one processor, storing instructions executable by the at least one processor. The instructions implement the method, including detecting at least one haptic event related to content output by the electronic device, detecting movement information indicating movement of a haptic providing module electrically coupled to the electronic device, via the at least one sensor, wherein the haptic providing module includes one or more haptic actuators, and selecting at least one haptic actuator of the one or more haptic actuators based on at least one attribute of the at least one haptic event and the detected movement information.

16 Claims, 12 Drawing Sheets

(58) Field of Classification Search
USPC .................................................... 340/407.1
See application file for complete search history.

(56) References Cited

U.S. PATENT DOCUMENTS

| | | | |
|---|---|---|---|
| 2010/0079356 A1* | 4/2010 | Hoellwarth | G02B 27/017 |
| | | | 345/8 |
| 2012/0050142 A1* | 3/2012 | Border | G09G 3/3611 |
| | | | 345/8 |
| 2015/0323993 A1 | 11/2015 | Levesque et al. | |
| 2016/0161747 A1 | 6/2016 | Osterhout | |
| 2016/0259408 A1* | 9/2016 | Messingher | G06F 3/012 |
| 2016/0274662 A1 | 9/2016 | Rimon et al. | |

FOREIGN PATENT DOCUMENTS

| | | |
|---|---|---|
| EP | 2 942 693 A1 | 11/2015 |
| KR | 10-2015-0129621 A | 11/2015 |

\* cited by examiner

METHOD FOR PROVIDING HAPTIC EFFECT AND ELECTRONIC DEVICE THERERFOR

CLAIM OF PRIORITY

This application claims the priority under 35 U.S.C. § 119(a) to Korean Patent Application Serial No. 10-2016-0149524, which was filed in the Korean Intellectual Property Office on Nov. 10, 2016, the entire content of which is hereby incorporated by reference.

TECHNICAL FIELD

The present disclosure relates to an apparatus and a method for providing a haptic effect in an electronic device.

BACKGROUND

In virtual reality applications, an electronic device (e.g., a computer) generates a simulated virtual environment or situation for the immersion of a user within the particular environment or situation. This enables the user to directly experience the particular environment or situation. Therefore, virtual reality can be used by a user to experience a fantastical environments, such as exploring the surface of a planetary satellite, or to undergo flight training, which users would otherwise cannot ordinarily experience in regular life.

SUMMARY

An apparatus for reproducing virtual reality content may include a Head-Mounted Display (HMD) apparatus. The HMD apparatus may be mounted on a user's head to display a large-sized screen or output a three-dimensional image in front of the user's eyes (e.g., according to the user's eye gaze). For example, the HMD apparatus may track the eye gaze of the user who experiences virtual reality content, may render in real time the virtual reality content, and may display the rendered virtual reality content on a display thereof.

However, the HMD apparatus provides virtual reality content only by using a visual sense from among various senses (e.g., visual sense, auditory sense, tactile sense, etc.) that the user can feel in the real world, and thus may cause the problem of limiting the sense of reality that the user can experience.

Various embodiments of the present disclosure provide an apparatus and a method capable of increasing the sense of reality of a user who uses a virtual reality service in an electronic device.

Various embodiments of the present disclosure provide an apparatus and a method capable of providing a haptic effect corresponding to an attribute of a haptic event based on movement information of a haptic actuator in an electronic device.

In accordance with an aspect of the present disclosure, an electronic device is disclosed, comprising at least one sensor, at least one processor, and a memory electrically coupled to the at least one processor, storing instructions executable by the at least one processor to cause the at least one processor to detect at least one haptic event related to content output by the electronic device, detect movement information indicating movement of a haptic providing module electrically coupled to the electronic device, via the at least one sensor, wherein the haptic providing module includes one or more haptic actuators, and select at least one haptic actuator of the one or more haptic actuators based on at least one attribute of the at least one haptic event and the detected movement information.

In accordance with an aspect of the present disclosure, a method of an electronic device is disclosed, including detecting at least one haptic event related to content output by the electronic device, detecting, by the at least one sensor, movement information indicating movement of a haptic providing module electrically coupled to the electronic device and including one or more haptic actuators, and select at least one haptic actuator of one or more haptic actuators based on at least one attribute of the detected at least one haptic event and the detected movement information.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
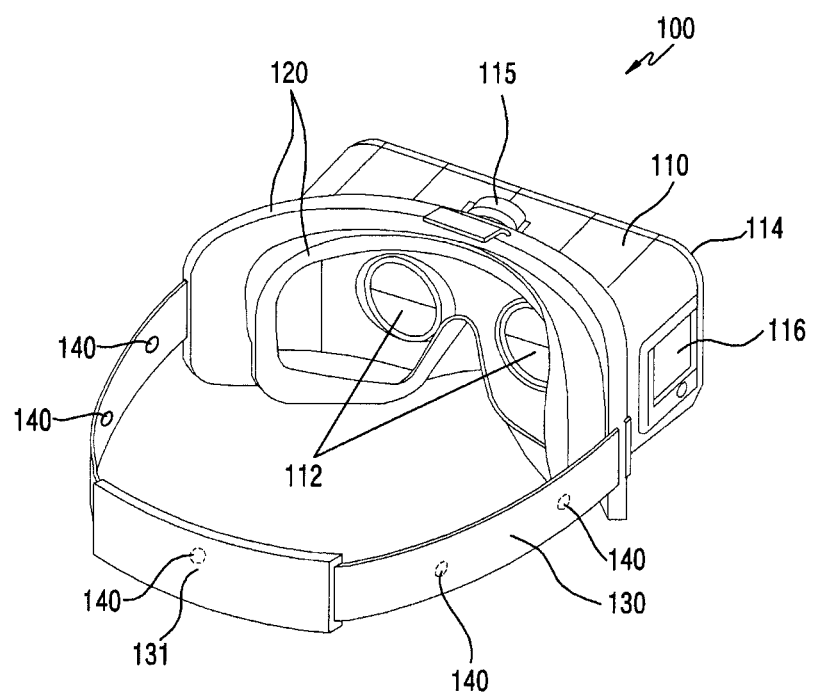
FIG. 1 is a perspective view of a display apparatus mountable on a head according to various embodiments of the present disclosure.

Hereinafter, various exemplary embodiments of the present document are described with reference to the accompanying drawings. It should be understood, however, that it is not intended to limit the various exemplary embodiments of the present document to the particular form disclosed, but, on the contrary, it is intended to cover all modifications, equivalents, and alternatives falling within the spirit and scope of the various exemplary embodiments of the present document. Like reference numerals denote like components throughout the drawings. A singular expression includes a plural concept unless there is a contextually distinctive difference therebetween.

In the present document, an expression "A or B", "A and/or B", or the like may include all possible combinations of items enumerated together. Although expressions such as "$1^{st}$", "$2^{nd}$", "first", and "second" may be used to express corresponding constitutional elements, it is not intended to limit the corresponding constitutional elements. When a certain (e.g., $1^{st}$) constitutional element is mentioned as being "operatively or communicatively coupled with/to" or "connected to" a different (e.g., $2^{nd}$) constitutional element, the certain constitutional element is directly coupled with/to another constitutional element or can be coupled with/to the different constitutional element via another (e.g., $3^{rd}$) constitutional element.

An expression "configured to" used in the present document may be interchangeably used with, for example, "suitable for", "having the capacity to", "adapted to", "made to", "capable of", or "designed to" in a hardware or software manner according to a situation. In a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an application processor) capable of performing corresponding operations by executing one or more software programs stored in a memory device.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to some embodiments, the electronic device (ex. home appliance) may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

In the following description, examples of a head-wearable apparatus may include an HMD apparatus which is mounted on a user's head and of which the movement occurs according to the movement of the user's head, audio output apparatuses (e.g., headphones, earphones, etc.), smart glasses, and the like.

FIG. 1 is a perspective view of an HMD apparatus according to various embodiments of the present disclosure.

Referring to FIG. 1, the HMD apparatus 100 may include: a body 110; and a strap 130 configured to be coupled to the body 110 and be fixed to a proper part (e.g., a head, etc.) of a human body.

According to an embodiment of the present disclosure, the body 110 may include a display 114 on a front surface thereof. For example, the display 114 of the body 110 may have a pair of optical lens parts 112 arranged therein. For example, the optical lens parts 112 may be arranged such that optical lenses of various magnifications overlap each other. A user of the HMD apparatus 100 may view an image displayed on the display 114 of the HMD apparatus 100 through the optical lens parts 112. For example, at an upper part of the body 110, a focus adjustment module 115 may be disposed in a protruding manner. The HMD apparatus 100 may adjust an image, which is displayed on the display 114, to be clearer through the focus adjustment module 115, and may provide the user with the clearer image. For example, the focus adjustment module 115 may be a rotatable mechanical ring-type knob. However, the present disclosure is not limited thereto, and thus various known adjusting schemes may also be used.

According to an embodiment of the present disclosure, a human-body wearing part 120, which is configured to be worn on the user's face including the user's eyes, may be included on a rear surface of the body 110. For example, the human-body wearing part 120 may use a flexible material to adaptively match different user faces. For example, the human-body wearing part 120 may use elastic materials, including rubber, silicone, urethane, and the like, which are harmless to humans.

According to an embodiment of the present disclosure, an input means 116 may be included on a lateral surface of the body 110. For example, after the user puts on the HMD apparatus 100 on his/her head, the user may control the input means 116, and thereby may perform various functions, including the position adjustment, size adjustment of an image, and the like of an object displayed on the display 114 of the HMD apparatus 100. For example, the input means 116 may include at least one of a touch panel and a physically-controlled button.

According to an embodiment of the present disclosure, the strap 130 may be configured to have an adjustable length so as to match the user's head. For example, the strap 130 may include a battery unit 131 that is usually placed at the center of the strap 130. For example, the battery unit 131 may include multiple battery cells, and when the HMD apparatus 100 is worn on the user's head, may be formed in a curve shape to be adaptable to the user's head.

According to an embodiment of the present disclosure, at least one haptic actuator 140 may be included in at least a partial area of the body 110 and the strap 130. For example, the movement of the haptic actuator 140 may occur so as to correspond to that of the HMD apparatus 100. For example, the haptic actuator 140 may be disposed on one surface of the body 110 and the strap 130 that the user's body contacts. For example, the haptic actuator 140 may include an element capable of performing operations, including vibration, electrical stimulation, and the like, and stimulating the user's tactile sense.

According to various embodiments of the present disclosure, the HMD apparatus 100 may include a device mounting part, which is configured to accommodate an external device (e.g., an electronic device including a display), on the front surface of the body 110. For example, the HMD apparatus 100 may include the device mounting part instead of the display 114 and may use the external device as a display.

Figure 2A:
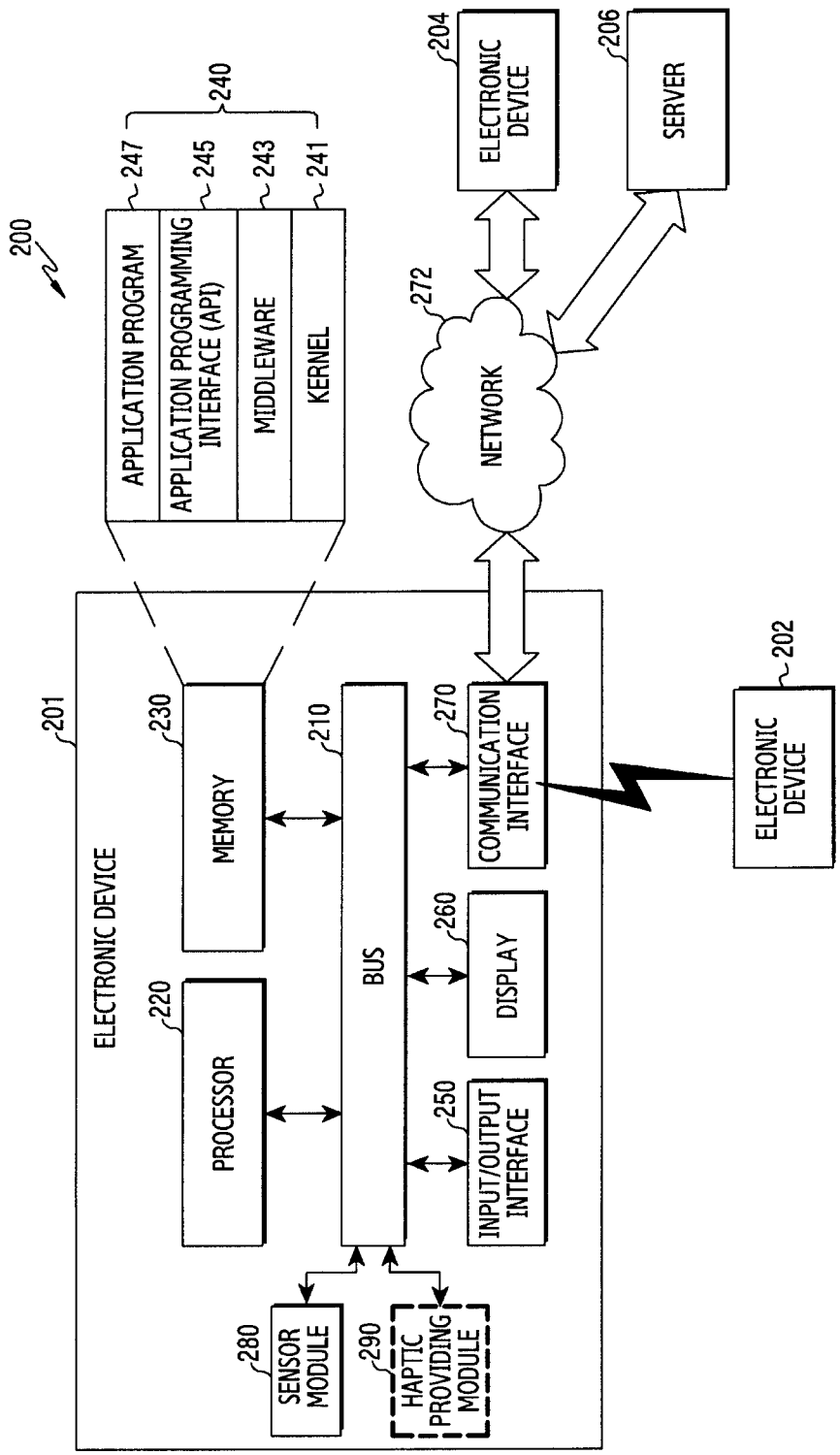
FIG. 2A is a view illustrating an electronic device within a network environment according to various embodiments of the present disclosure.

FIG. 2A is a view illustrating an electronic device 201 within a network environment 200 according to various embodiments of the present disclosure. In the following description, the electronic device 201 may include the HMD apparatus 100 including the display as illustrated in FIG. 1.

Referring to FIG. 2A, the electronic device 201 may include a bus 210, a processor 220 (e.g., including processing circuitry), a memory 230, an input/output interface 250 (e.g., including input/output circuitry), a display 260 (e.g., including display circuitry), a communication interface 270 (e.g., including communication circuitry), a sensor module 280 (e.g., including sensor), and a haptic providing module 290 (e.g., including haptic providing circuitry). In some embodiments of the present disclosure, at least one of the above elements of the electronic device 201 may be omitted from the electronic device 201, or the electronic device 201 may additionally include other elements. For example, the haptic providing module 290 may be omitted from the electronic device 201.

The bus 210 may include, for example, a circuit configured to interconnect the elements 220 to 290 and deliver a communication (e.g., a control message and/or data) between the elements 220 to 290.

The processor 220 may include one or more of a Central Processing Unit (CPU), an Application Processor (AP), an Image Signal Processor (ISP), and a Communication Processor (CP). The processor 220 may perform, for example, calculations or data processing related to control over and/or communication by at least one of the other elements of the electronic device 201.

According to an embodiment of the present disclosure, the processor 220 may render content. For example, the processor 220 may render an image of content with reference to eye gaze information of a user acquired through the sensor module 280, and may display the rendered image on the display 260. Additionally or alternatively, the processor 220 may render a sound corresponding to an image of content and may output the rendered sound to the outside through a speaker (not illustrated) of the electronic device 201.

According to an embodiment of the present disclosure, the processor 220 may control the electronic device 201 based on user input information. For example, the processor 220 may control at least one object, which is displayed on the display 260, with reference to eye gaze information of the user acquired through the sensor module 280.

According to an embodiment of the present disclosure, when the processor 220 detects a haptic event from content, the processor 220 may control the haptic providing module 290 to provide a haptic effect. For example, when the processor 220 detects a haptic event from content being reproduced by the electronic device 201, the processor 220 may identify an attribute of the detected haptic event and a characteristic of the haptic providing module 290. The processor 220 may perform a control operation for selecting and activating at least one haptic actuator, which corresponds to the identified attribute of the haptic event, based on movement information of at least one haptic actuator (e.g., the haptic actuator 140 of FIG. 1) included in the haptic providing module 290. Additionally or alternatively, the processor 220 may update a driving parameter of a haptic actuator based on movement information of the haptic actuator. For example, an attribute of a haptic event may include at least one of the direction, strength, and type of the haptic event. A characteristic of the haptic providing module may include at least one of the location of a haptic actuator included in the haptic providing module, whether the movement of the haptic actuator occurs, and a haptic providing range. A driving parameter may include at least one of a direction, strength, and pattern of a haptic effect for driving a haptic actuator.

The memory 230 may include a volatile memory and/or a non-volatile memory. The memory 230 may store, for example, commands or data related to at least one of the other elements of the electronic device 201. For example, the memory 230 may store a characteristic of each haptic actuator included in the haptic providing module 290.

According to an embodiment of the present disclosure, the memory 230 may store software and/or a program 240. For example, the program 240 may include a kernel 241, middleware 243, an Application Programming Interface (API) 245, an application program (or an application) 247, or the like. At least some of the kernel 241, the middleware 243, and the API 245 may be referred to as an "Operating System (OS)."

For example, the kernel 241 may control or manage system resources (e.g., the bus 210, the processor 220, the memory 230, etc.) used to execute operations or functions implemented by the other programs (e.g., the middleware 243, the API 245, and the application program 247). Also, the kernel 241 may provide an interface capable of controlling or managing the system resources by accessing the individual elements of the electronic device 201 by using the middleware 243, the API 245, or the application program 247.

For example, the middleware 243 may serve as an intermediary that enables the API 245 or the application program 247 to communicate with the kernel 241 and to exchange data therewith. Also, the middleware 243 may process one or more task requests received from the application program 247 according to a priority. For example, the middleware 243 may assign a priority, which enables the use of system resources (e.g., the bus 210, the processor 220, the memory 230, etc.) of the electronic device 201, to at least one of the application programs 247, and may process the one or more task requests according to the assigned priority. The API 245 is an interface through which the application program 247 controls a function provided by the kernel 241 or the middleware 243, and may include, for example, at least one interface or function (e.g., command) for file control, window control, image processing, character control, or the like.

For example, the input/output interface 250 may serve as an interface capable of delivering a command or data, which is input from a user or another external device, to the element(s) other than the input/output interface 250 within the electronic device 201.

Examples of the display 260 may include a Liquid Crystal Display (LCD), a Light-Emitting Diode (LED) display, an Organic Light-Emitting Diode (OLED) display, a MicroElectroMechanical Systems (MEMS) display, and an electronic paper display. For example, the display 260 may display various pieces of content (e.g., text, images, videos, icons, symbols, and/or the like.) to the user. The display 260 may include a touch screen, and may receive, for example, a touch input, a gesture input, a proximity input, or a hovering input provided by an electronic pen or a body part of the user.

The communication interface 270 may establish, for example, communication between the electronic device 201 and an external device (e.g., a first external electronic device 202, a second external electronic device 204, or a server 206). For example, the communication interface 270 may be connected to a network 272 through wireless or wired communication and may communicate with the external device (e.g., the second external electronic device 204 or the server 206).

The types of wireless communication may include, for example, cellular communication which uses at least one of Long-Term Evolution (LTE), LTE-Advanced (LTE-A), Code Division Multiple Access (CDMA), Wideband CDMA (WCDMA), Universal Mobile Telecommunications System (UMTS), WiBro (Wireless Broadband), and Global System for Mobile Communications (GSM). According to an embodiment of the present disclosure, the types of wireless communication may include at least one of, for example, Wi-Fi, Bluetooth, Bluetooth Low Energy (BLE), ZigBee, Near Field Communication (NFC), magnetic secure transmission, Radio Frequency (RF), and Body Area Network (BAN). According to an embodiment of the present disclosure, the types of wireless communication may include a GNSS. The GNSS may be, for example, a Global Positioning System (GPS), a Global Navigation Satellite System (GLONASS), a Beidou Navigation Satellite System (Beidou), or a European Global Satellite-based Navigation System (Galileo). Hereinafter, in the present disclosure, the term "GPS" may be used interchangeably with the term "GNSS." The types of wired communication may include at least one of, for example, a Universal Serial Bus (USB), a High Definition Multimedia Interface (HDMI), Recommended Standard 232 (RS-232), Power Line communication (PLC), and a Plain Old Telephone Service (POTS). The network 272 may include at least one of telecommunication networks, such as a computer network (e.g., a Local Area Network (LAN) or a Wide Area Network (WAN)), the Internet, and a telephone network.

Each of the first and second external electronic devices 202 and 204 may be of a type identical to or different from that of the electronic device 201. According to various embodiments of the present disclosure, all or some of operations performed by the electronic device 201 may be performed by another electronic device or multiple electronic devices (e.g., the first and second external electronic devices 202 and 204 or the server 206). According to an embodiment of the present disclosure, when the electronic device 201 needs to perform some functions or services automatically or by a request, the electronic device 201 may send, to another device (e.g., the first external electronic device 202, the second external electronic device 204, or the server 206), a request for performing at least some functions related to the functions or services, instead of performing the functions or services by itself, or additionally. Another electronic device (e.g., the first external electronic device 202, the second external electronic device 204, or the server 206) may execute the requested functions or the additional functions, and may deliver a result of the execution to the electronic device 201. The electronic device 201 may process the received result without any change or additionally and may provide the requested functions or services. To this end, use may be made of, for example, cloud computing technology, distributed computing technology, or client-server computing technology.

The sensor module 280 may include at least one sensor, and may measure a physical quantity corresponding to the electronic device 201, or may sense a movement state of the electronic device 201. For example, the sensor module 280 may include at least one of a gyro sensor, an atmospheric pressure sensor, and an acceleration sensor. Additionally or alternatively, the sensor module 280 may further include a control circuit configured to control at least one sensor.

The haptic providing module 290 may include at least one haptic actuator (e.g., the haptic actuator 140 of FIG. 1) disposed in at least a partial area (e.g., the strap 130 of FIG. 1) of the electronic device 201. For example, at least one haptic actuator included in the haptic providing module 290 may generate a movement corresponding to the movement of the electronic device 201. The haptic actuators included in the haptic providing module 290 may be arranged in different areas of the electronic device 201, and include unique characteristics for providing a haptic effect. For example, the haptic providing module 290 may be connected to the other elements 220 to 280 of the electronic device 201 in a wired or wireless manner. The at least one haptic actuator included in the haptic providing module 290 may include an element capable of performing operations, including vibration, electrical stimulation, and the like, and stimulating the user's tactile sense.

According to various embodiments of the present disclosure, when the electronic device 201 is mounted to an HMD apparatus as a display, the electronic device 201 may provide a haptic effect by using a haptic providing module included in the HMD apparatus (an external device). For example, when the electronic device 201 is mounted to the HMD apparatus, the processor 220 may acquire characteristic information of each haptic actuator included in the haptic providing module of the HMD apparatus. When the processor 220 detects a haptic event from content being reproduced by the electronic device 201, the processor 220 may select at least one haptic actuator corresponding to an attribute of the detected haptic event based on movement information of at least one haptic actuator included in the haptic providing module of the HMD apparatus. The processor 220 may control the communication interface 270 to transmit, to each haptic actuator, a control signal (a haptic signal) for controlling the at least one haptic actuator corresponding to the attribute of the detected haptic event. Additionally or alternatively, a control signal may include a driving parameter of a haptic actuator which is updated based on movement information of the haptic actuator.

Figure 2B:
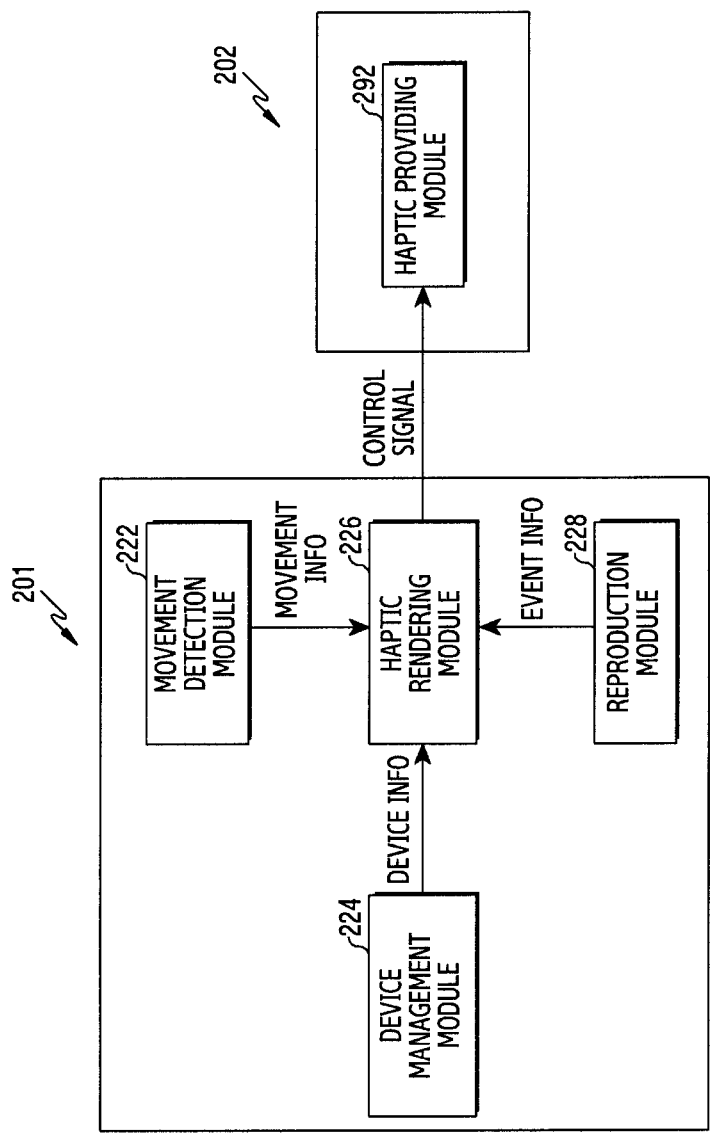
FIG. 2B is a block diagram illustrating blocks for haptic rendering in an electronic device according to various embodiments of the present disclosure.

FIG. 2B is a block diagram illustrating blocks for haptic rendering in an electronic device according to various embodiments of the present disclosure. In the following description, the electronic device 201 may be mounted to the HMD apparatus 202 as a display of the HMD apparatus 202.

Referring to FIG. 2B, the electronic device 201 may include a movement detection module 222, a device management module 224, a haptic rendering module 226, and a reproduction module 228. In some embodiments of the present disclosure, all or at least some of the movement detection module 222, the device management module 224, the haptic rendering module 226, and the reproduction module 228 may be included in the processor 220 of FIG. 2A.

According to an embodiment of the present disclosure, the movement detection module 222 may detect the movement of the electronic device 201 by using sensing data received from a sensor (e.g., the sensor module 280 of FIG. 2A) of the electronic device 201. For example, when the electronic device 201 is mounted to the HMD apparatus 202, the movement detection module 222 may determine that the movement of the electronic device 201 detected by the sensor of the electronic device 201 is the movement of the HMD apparatus 202.

According to an embodiment of the present disclosure, the device management module 224 may collect and manage information on an external device electrically connected to the electronic device 201 so as to reproduce content. For example, the device management module 224 may collect and manage characteristic information of the haptic providing module 290 included in the electronic device 201. For example, the device management module 224 may collect and manage characteristic information of a haptic providing module 292 of the HMD apparatus 202 electrically connected to the electronic device 201. For example, when the electronic device 201 is connected to the HMD apparatus 202 through communication, the device management module 224 may receive and store characteristic information of the haptic providing module 292 from the HMD apparatus 202. For example, characteristic information of the haptic providing module may be included in the form shown in Table 1 below.

TABLE 1

| Device 1 | |
|---|---|
| actuator information | piezo |
| type | HMD |
| direction arrange | R2 L2 F2 R2 |
| generated force | 200 g/m² |

According to an embodiment of the present disclosure, in Table 1, a device 1 (e.g., the HMD apparatus 202) may include a piezo actuator based on an actuator information field, and may include an array of two actuators on each of the left, right, front, and rear sides based on a direction arrange field. The device 1 may represent a range (e.g., a maximum of 200 g/m²) of a strength that an actuator can reproduce, based on a generated force field.

According to an embodiment of the present disclosure, the haptic rendering module 226 may generate a control signal for controlling a haptic actuator. For example, when the reproduction module 228 detects haptic event information, the haptic rendering module 226 may select at least one haptic actuator, which corresponds to an attribute of a haptic event, based on characteristic information of the haptic providing module 292 of the device management module 224. The haptic rendering module 226 may generate a haptic signal (a control signal) for driving the at least one haptic actuator corresponding to the attribute of the haptic event. Specifically, when the haptic rendering module 226 reproduces the effect of the occurrence of a large collision on the left of a user of the electronic device 201 by using the characteristic information of the haptic providing module 292 shown in Table 1, the haptic rendering module 226 may select the two actuators arranged on the left. The haptic rendering module 226 may generate a haptic signal for causing a maximum magnitude of a haptic effect (e.g., vibration) from each of the two actuators arranged on the left, and may transmit the generated haptic signal to each actuator. Additionally or alternatively, when the haptic providing module 292 is affected by a movement, the haptic rendering module 226 may select at least one haptic actuator corresponding to an attribute of a haptic event based on characteristic information and movement information of the haptic providing module 292. The haptic rendering module 226 may generate a haptic signal so as to include a driving parameter for driving each haptic actuator which is updated based on movement information of the selected haptic actuator.

According to an embodiment of the present disclosure, the reproduction module 228 may render content to be reproduced by the electronic device 201. For example, the reproduction module 228 may render at least one of an image and a sound of the content with reference to eye gaze information of a user and may output at least one of the rendered image and sound of the content to the outside through an output apparatus (e.g., the display 260) of the electronic device 201. For example, the eye gaze information of the user may be acquired based on sensing data detected by the sensor module 280 of the electronic device 201.

Figure 2C:
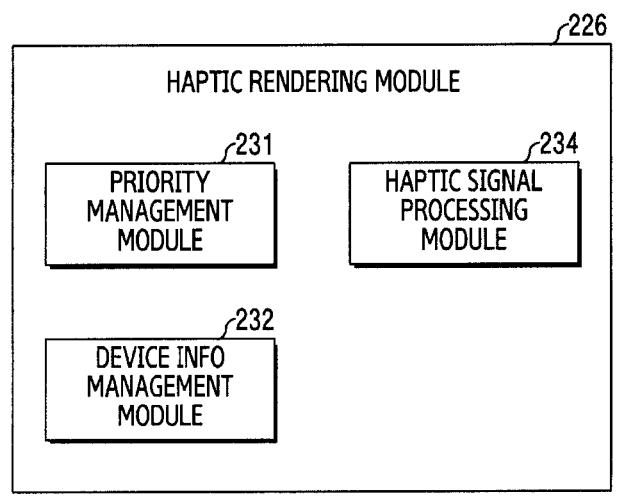
FIG. 2C is a block diagram illustrating a configuration of a haptic rendering module of an electronic device according to various embodiments of the present disclosure.

FIG. 2C is a block diagram illustrating a configuration of a haptic rendering module of an electronic device according to various embodiments of the present disclosure. In the following description, a configuration described below may include an internal configuration of the haptic rendering module 226 of FIG. 2B.

Referring to FIG. 2C, the haptic rendering module 226 may include a priority management module 231, a device information management module 232, and a haptic signal processing module 234.

According to an embodiment of the present disclosure, the priority management module 231 may set and control a priority of a haptic event. For example, when the reproduction module 228 of FIG. 2B detects multiple haptic events from content, the priority management module 231 may set a priority of each haptic event. When the multiple haptic events are detected, the priority management module 231 may set the priorities of the respective haptic events so as to cause haptic effects respectively corresponding to the multiple haptic events to sequentially occur. When the multiple haptic events are detected, the priority management module 231 may set the priorities of the respective haptic events so as to cause haptic effects respectively corresponding to the multiple haptic events to simultaneously occur. For example, the priority management module 231 may set a priority of a haptic event based on at least one of the type of the haptic event, a time point of occurrence thereof, and the strength thereof.

According to an embodiment of the present disclosure, the device information management module 232 may manage characteristic information of a haptic providing module received from the device management module 224 of FIG. 2B so that the characteristic information of the haptic providing module can be used when the haptic signal processing module 234 generates a haptic signal (a control signal). For example, when the electronic device 201 is electrically connected to multiple haptic actuators, the device information management module 232 may manage characteristic information of each of the multiple haptic actuators included in the haptic providing module so that the haptic signal processing module 234 may generate a haptic signal corresponding to each of the haptic actuators.

According to an embodiment of the present disclosure, the haptic signal processing module 234 may generate a haptic signal (a control signal) for controlling at least one haptic actuator corresponding to an attribute of a haptic event. For example, the haptic signal processing module 234 may generate a haptic signal for a haptic actuator corresponding to an attribute of each haptic event from the device information management module 232. For example, a haptic signal may include a driving parameter for driving each haptic actuator determined based on an attribute of a haptic event and movement information of a haptic actuator.

Figure 3:
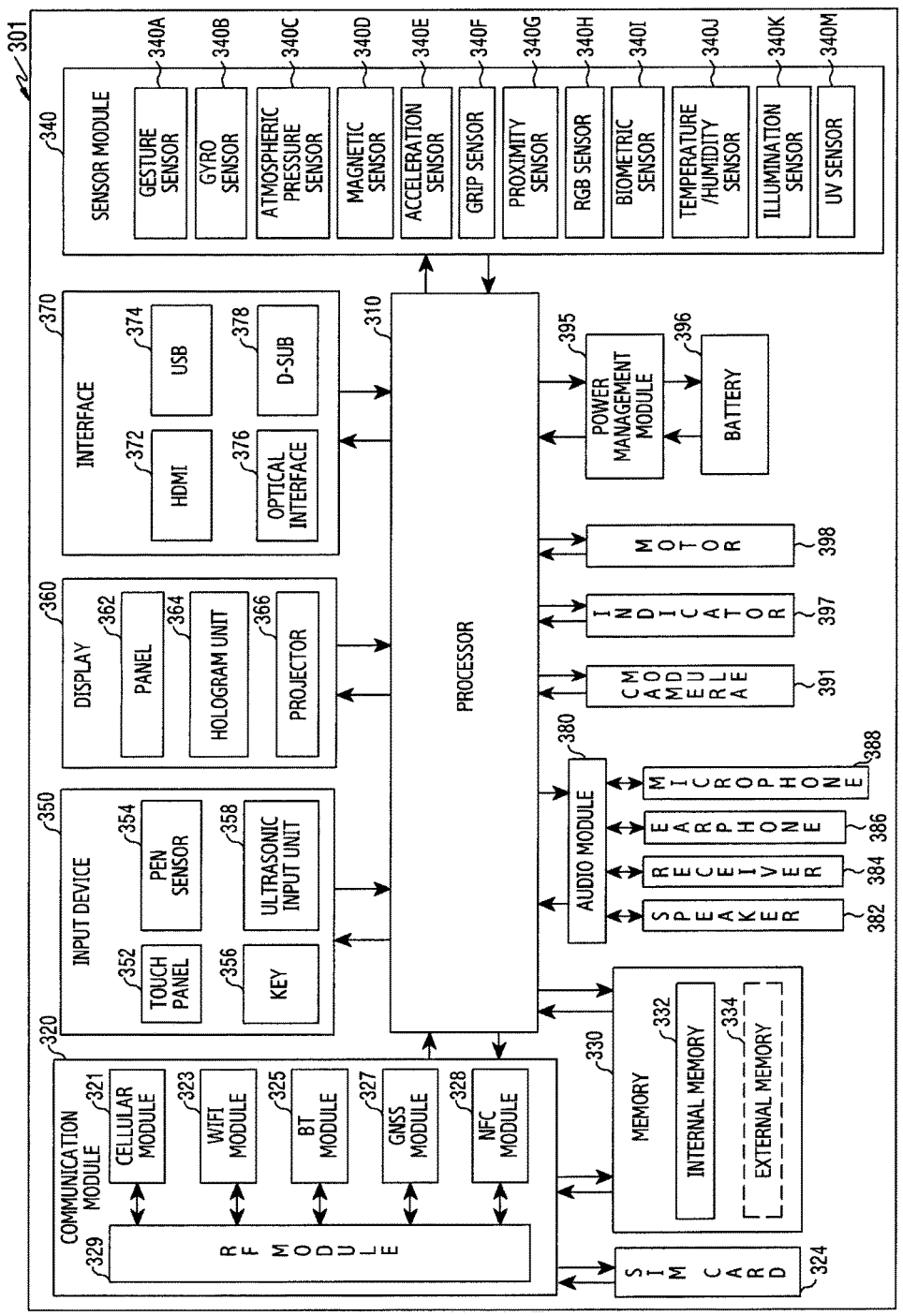
FIG. 3 is a block diagram illustrating a configuration of an electronic device according to various embodiments of the present disclosure.

FIG. 3 is a block diagram illustrating a configuration of an electronic device 301 according to various embodiments of the present disclosure. The electronic device 301 may include, for example, the whole or part of the electronic device 201 illustrated in FIG. 2A.

Referring to FIG. 3, the electronic device 301 may include at least one processor (e.g., an AP) 310, a communication module 320, a subscriber identification module 324, a memory 330, a sensor module 340, an input apparatus 350, a display 360, an interface 370, an audio module 380, a camera module 391, a power management module 395, a battery 396, an indicator 397, and a motor 398.

The processor 310 may control multiple hardware or software elements connected to the processor 310 and may perform the processing of and arithmetic operations on various data, by running, for example, an OS or an application program. The processor 310 may be implemented by, for example, a System on Chip (SoC). According to an embodiment of the present disclosure, the processor 310 may further include a Graphics Processing Unit (GPU) and/or an ISP. The processor 310 may include at least some (e.g., a cellular module 321) of the elements illustrated in FIG. 3. The processor 310 may load, into a volatile memory, instructions or data received from at least one (e.g., a non-volatile memory) of the other elements and may process the loaded instructions or data, and may store the resulting data in a non-volatile memory.

The communication module 320 may have a configuration identical or similar to that of the communication interface 270 of FIG. 2A. The communication module 320 may include, for example, the cellular module 321, a Wi-Fi module 323, a Bluetooth (BT) module 325, a GNSS module 327, an NFC module 328, and an RF module 329.

For example, the cellular module 321 may provide a voice call, a video call, a text message service, an Internet service, and the like through a communication network. According to an embodiment of the present disclosure, the cellular module 321 may identify or authenticate the electronic device 301 in the communication network by using the subscriber identification module (e.g., a 'SIM') card) 324. According to an embodiment of the present disclosure, the cellular module 321 may perform at least some of the functions that the processor 310 may provide. According to an embodiment of the present disclosure, the cellular module 321 may include a CP.

According to some embodiments of the present disclosure, at least some (e.g., two or more) of the cellular module 321, the Wi-Fi module 323, the BT module 325, the GNSS module 327, and the NFC module 328 may be included in one Integrated Chip (IC) or IC package.

The RF module 329 may transmit and receive, for example, communication signals (e.g., RF signals). The RF module 329 may include, for example, a transceiver, a Power Amplifier Module (PAM), a frequency filter, a Low Noise Amplifier (LNA), and an antenna. According to another embodiment of the present disclosure, at least one of the cellular module 321, the Wi-Fi module 323, the BT module 325, the GNSS module 327, and the NFC module 328 may transmit and receive RF signals through a separate RF module. The subscriber identification module 324 may include, for example, a card including a subscriber identity module or an embedded SIM, and may contain unique identification information (e.g., an Integrated Circuit Card Identifier (ICCID)) or subscriber information (e.g., an International Mobile Subscriber Identity (IMSI)).

The memory 330 (e.g., the memory 230 of FIG. 2A) may include, for example, an internal memory 332 or an external memory 334. The internal memory 332 may include at least one of, for example, a volatile memory (e.g., a Dynamic Random Access Memory (DRAM), a Static RAM (SRAM), a Synchronous DRAM (SDRAM), etc.); and a non-volatile memory (e.g., a One Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a flash memory, a hard drive, and a Solid State Drive (SSD)). The external memory 334 may include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 334 may be functionally or physically connected to the electronic device 301 through various interfaces.

For example, the sensor module 340 (e.g., the sensor module 280 of FIG. 2A) may measure a physical quantity or may detect an operation state of the electronic device 301, and may convert the measured physical quantity or the detected operation state into an electrical signal. The sensor module 340 may include at least one of, for example, a gesture sensor 340A, a gyro sensor 340B, an atmospheric pressure sensor 340C, a magnetic sensor 340D, an acceleration sensor 340E, a grip sensor 340F, a proximity sensor 340G, a color sensor 340H (e.g., a Red-Green-Blue (RGB) sensor), a biometric sensor 340I, a temperature/humidity sensor 340J, an illuminance sensor 340K, and an Ultraviolet (UV) sensor 340M. Additionally or alternatively, the sensor module 340 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 340 may further include a control circuit for controlling one or more sensors included therein. In some embodiments of the present disclosure, the electronic device 301 may further include a processor configured to control the sensor module 340 as a part of or separately from the processor 310, and may control the sensor module 340 while the processor 310 is in a sleep state. For example, the temperature/humidity sensor 340J may include multiple temperature sensors arranged at different locations.

The input apparatus 350 may include, for example, a touch panel 352, a (digital) pen sensor 354, a key 356, and an ultrasonic input unit 358. The touch panel 352 may use at least one of, for example, a capacitive scheme, a resistive scheme, an infrared scheme, and a surface acoustic wave scheme. Also, the touch panel 352 may further include a control circuit. The touch panel 352 may further include a tactile layer and may provide a tactile reaction to the user. The (digital) pen sensor 354 may include, for example, a recognition sheet that is a part of the touch panel or is separated from the touch panel. The key 356 may be, for example, a physical button, an optical key, and a keypad. The ultrasonic input unit 358 may sense an ultrasonic wave generated by an input means through a microphone (e.g., a microphone 388), and may confirm data corresponding to the sensed ultrasonic wave.

The display 360 (e.g., the display 260 of FIG. 2A) may include a panel 362, a hologram unit 364, a projector 366, and/or a control circuit for controlling the same. The panel 362 may be implemented to be, for example, flexible, transparent, or wearable. The panel 362 together with the touch panel 352 may be implemented as one or more modules. The hologram unit 364 may display a three-dimensional image in the air by using the interference of light. The projector 366 may display an image by projecting light onto a screen. The screen may be located, for example, inside or outside the electronic device 301. The interface 370 may include, for example, a High-Definition Multimedia Interface (HDMI) 372, a Universal Serial Bus (USB) 374, an optical interface 376, and a D-subminiature (D-sub) 378. The interface 370 may be included in, for example, the communication interface 270 illustrated in FIG. 2. Additionally or alternatively, the interface 370 may include, for example, a Mobile High-definition Link (MHL) interface, a Secure Digital (SD) card/Multi-Media Card (MMC) interface, or an Infrared Data Association (IrDA) standard interface.

For example, the audio module 380 may bidirectionally convert between a sound and an electrical signal. At least some elements of the audio module 380 may be included in, for example, the input/output interface 250 illustrated in FIG. 2A. The audio module 380 may process sound information which is input or output through, for example, a speaker 382, a receiver 384, an earphone 386, the microphone 388, or the like.

The camera module 391 is, for example, a device capable of capturing a still image and a moving image. According to an embodiment of the present disclosure, the camera module 391 may include one or more image sensors (e.g., a front sensor or a back sensor), a lens, an Image Signal Processor (ISP), and a flash (e.g., an LED, a xenon lamp, or the like). The power management module 395 may manage, for example, power of the electronic device 301.

The power management module 395 may include a Power Management Integrated Circuit (PMIC), a charger IC, or a battery or fuel gauge. The PMIC may use a wired and/or wireless charging method. Examples of the wireless charging method may include, for example, a magnetic resonance method, a magnetic induction method, an electromagnetic method, and the like. The PMIC may further include additional circuits (e.g., a coil loop, a resonant circuit, a rectifier, etc.) for wireless charging. The battery gauge may measure, for example, a residual quantity of the battery 396, and a voltage, a current, or a temperature during charging. The battery 396 may include, for example, a rechargeable battery and/or a solar battery.

The indicator 397 may display a particular state (e.g., a booting state, a message state, a charging state, or the like) of the electronic device 301 or a part (e.g., the processor 310) of the electronic device 301. The motor 398 may convert an electrical signal into a mechanical vibration, and may generate a vibration, a haptic effect, or the like. The electronic device 301 may include, for example, a mobile television (TV) support unit (e.g., a GPU) that may process media data according to a standard, such as Digital Multimedia Broadcasting (DMB), Digital Video Broadcasting (DVB), or mediaFLO™.

Each of the above-described elements of hardware according to the present disclosure may include one or more components, and the names of the corresponding elements may vary based on the type of electronic device. In various embodiments of the present disclosure, the electronic device (e.g., the electronic device 301) may omit some elements or may further include additional elements, or some of the elements of the electronic device may be combined into one entity, which may perform functions identical to those of the relevant elements before the combination thereof.

Figure 4:
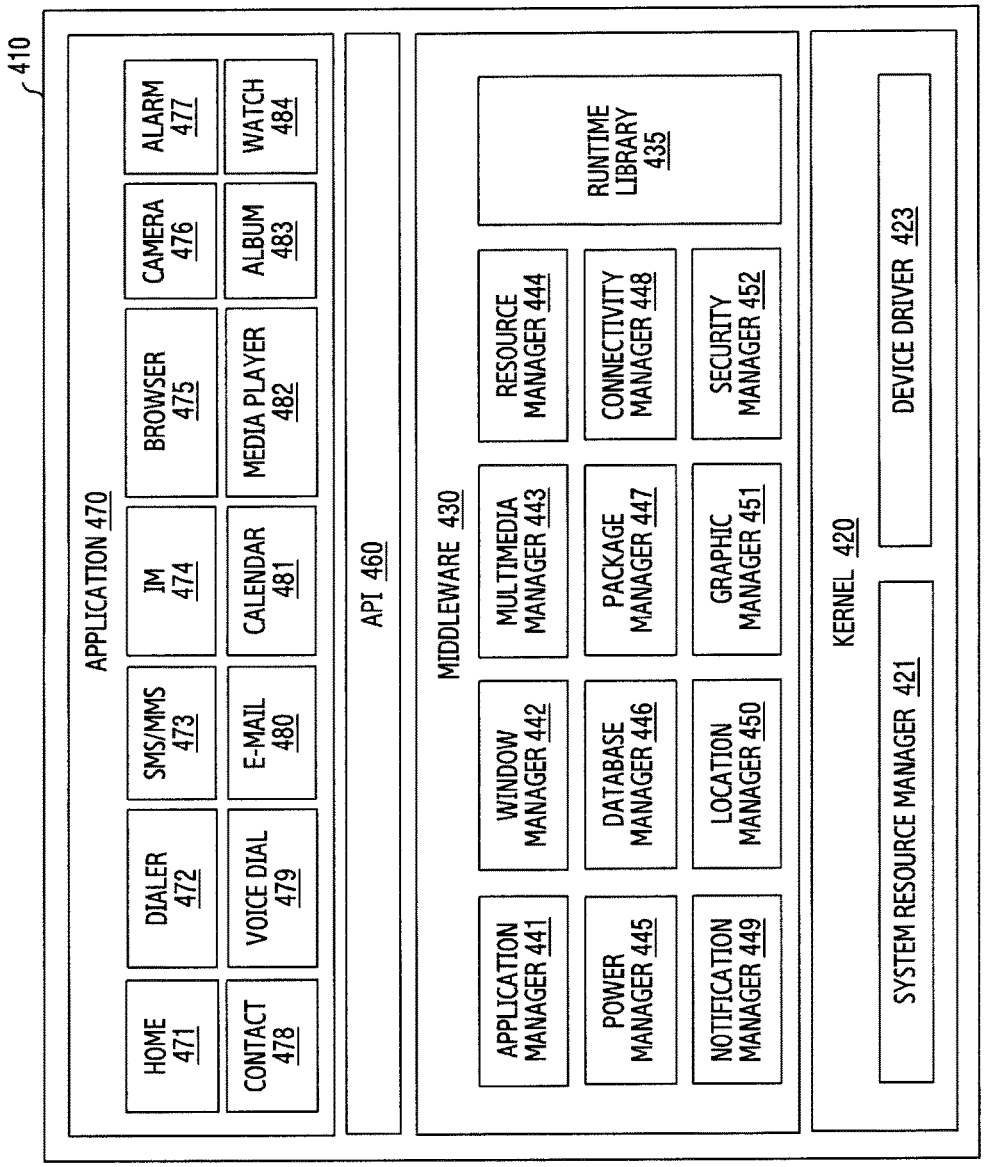
FIG. 4 is a block diagram illustrating a configuration of a program module according to various embodiments of the present disclosure.

FIG. 4 is a block diagram illustrating a configuration of a program module according to various embodiments of the present disclosure. According to an embodiment of the present disclosure, the program module 410 (e.g., the program 240 of FIG. 2A) may include an OS for controlling resources related to the electronic device (e.g., the electronic device 201 of FIG. 2A) and/or various applications (e.g., the application programs 247 of FIG. 2A) executed in the OS. The OS may be, for example, Android™, iOS™, Windows™, Symbian™, Tizen™, and Bada™.

Referring to FIG. 4, the program module 410 may include a kernel 420 (e.g., the kernel 241 of FIG. 2A), middleware 430 (e.g., the middleware 243 of FIG. 2A), an API 460 (e.g., the API 245 of FIG. 2A), and/or an application 470 (e.g., the application program 247 of FIG. 2A). At least some of the program module 410 may be preloaded on the electronic device, or may be downloaded from an external electronic device (e.g., the electronic device 202 or 204, or the server 206 of FIG. 2A).

The kernel 420 may include, for example, a system resource manager 421 and/or a device driver 423. The system resource manager 421 may control, allocate, or retrieve system resources. According to an embodiment of the present disclosure, the system resource manager 421 may include a process manager, a memory manager, or a file system manager. The device driver 423 may include, for example, a display driver, a camera driver, a Bluetooth driver, a shared memory driver, a USB driver, a keypad driver, a Wi-Fi driver, an audio driver, or an Inter-Process Communication (IPC) driver. For example, the middleware 430 may provide a function required in common by the applications 470, or may provide various functions to the applications 470 through the API 460 so as to enable the applications 470 to use the limited system resources within the electronic device. According to an embodiment of the present disclosure, the middleware 430 may include at least one of a runtime library 435, an application manager 441, a window manager 442, a multimedia manager 443, a resource manager 444, a power manager 445, a database manager 446, a package manager 447, a connectivity manager 448, a notification manager 449, a location manager 450, a graphic manager 451, and a security manager 452.

The runtime library 435 may include, for example, a library module that a complier uses to add a new function by using a programming language during the execution of the application 470. The runtime library 435 may manage input/output, manage a memory, or process an arithmetic function. The application manager 441 may manage, for example, the life cycle of the application 470. The window manager 442 may manage Graphical User Interface (GUI) resources used for the screen. The multimedia manager 443 may determine formats required to reproduce media files, and may encode or decode a media file by using a coder/decoder (codec) appropriate for the relevant format. The resource manager 444 may manage a source code of the application 470 or a space in a memory. For example, the power manager 445 may manage the capacity of a battery or power, and may provide power information required for an operation of the electronic device. According to an embodiment of the present disclosure, the power manager 445 may operate in conjunction with a Basic Input/Output System (BIOS). The database manager 446 may, for example, generate, search, or change a database to be used by the application 470. The package manager 447 may manage the installation or update of an application distributed in the form of a package file.

The connectivity manager 448 may manage, for example, a wireless connection. The notification manager 449 may provide a user with an event, such as an arrival message, an appointment, a proximity notification, and the like. The location manager 450 may manage, for example, location information of the electronic device. For example, the graphic manager 451 may manage a graphic effect, which is to be provided to the user, or a user interface related to the graphic effect. The security manager 452 may provide, for example, system security or user authentication. According to an embodiment of the present disclosure, the middleware 430 may include a telephony manager configured to manage a voice call function or a video call function of the electronic device, or may include a middleware module capable of forming a combination of functions of the above-described elements. According to an embodiment of the present disclosure, the middleware 430 may provide a module specialized for each type of OS. The middleware 430 may dynamically delete some of the existing elements, or may add new elements. The API 460 is, for example, a set of API programming functions, and may be provided with a different configuration for each OS. For example, in the case of Android or iOS, one API set may be provided for each platform, and in the case of Tizen, two or more API sets may be provided for each platform.

The application 470 may include, for example, a home 471, a dialer 472, an SMS/MMS 473, an Instant Message (IM) 474, a browser 475, a camera 476, an alarm 477, a contact 478, a voice dialer 479, an email 480, a calendar 481, a media player 482, an album 483, a watch 484, a health care application (e.g., which measures an exercise quantity, a blood sugar level, or the like), and an application for providing environmental information (e.g., information on atmospheric pressure, humidity, or temperature). According to an embodiment of the present disclosure, the application 470 may include an information exchange application capable of supporting information exchange between the electronic device and an external electronic device. The information exchange application may include, for example, a notification relay application for delivering particular information to an external electronic device or a device management application for managing an external electronic device. For example, the notification relay application may deliver, to an external electronic device, notification information generated by the other applications of the electronic device, or may receive notification information from an external electronic device and may provide the received notification information to the user. The device management application may install, delete, or update, for example, a function (e.g., turning on/off an external electronic device itself (or some elements thereof) or adjusting the brightness (or resolution) of the display) of the external electronic device communicating with the electronic device, or an application executed by the external electronic device. According to an embodiment of the present disclosure, the application 470 may include an application (e.g., a health care application of a mobile medical device) designated according to an attribute of an external electronic device. According to an embodiment of the present disclosure, the application 470 may include an application received from an external electronic device. At least part of the program module 410 may be implemented (e.g., executed) in software, firmware, hardware (e.g., the processor 310 of FIG. 3), or a combination of at least two thereof, and may include a module, a program, a routine, a set of instructions, or a process for performing one or more functions.

According to various embodiments of the present disclosure, an electronic device may include: at least one sensor; at least one processor; and a memory configured to be electrically connected to the at least one processor, wherein the memory may store instructions that, when executed by the at least one processor, cause the at least one processor to: detect at least one haptic event from content being played by the electronic device; detect movement information indicating movement of a haptic providing module electrically connected to the electronic device, via the at least one sensor; and select at least one haptic actuator among one or more haptic actuators included in the haptic providing module, based on at least one attribute of the at least one haptic event and the detected movement information of the haptic providing module.

According to various embodiments of the present disclosure, the haptic providing module including the one or more haptic actuators are disposed in an apparatus wearable on a head of a user.

According to various embodiments of the present disclosure, the apparatus comprises a Head-Mounted Display (HMD).

According to various embodiments of the present disclosure, the instructions further comprise: detecting whether detection of the movement information of the haptic providing module is required, based on at least one of the attribute of the haptic event and a determination as to whether the haptic providing module is movable; and detecting the movement information of the haptic providing module when the movement information of the haptic providing module is determined to be required.

According to various embodiments of the present disclosure, the instructions further comprise: detecting the movement information of the haptic providing module based on movement information, which is acquired via the at least one sensor, of an apparatus wearable on a head of a user.

According to various embodiments of the present disclosure, the instructions further comprise: detecting a difference between a location corresponding to a haptic occurrence direction indicated by the attribute of the haptic event and a location of the selected at least one haptic actuator; and controlling driving of the selected at least one haptic actuator based on the difference between the haptic occurrence direction and the location.

According to various embodiments of the present disclosure, the controlling driving of the selected at least one haptic actuator further comprises: changing at least one of a direction of the haptic effect, a pattern of the haptic effect, a strength of the haptic effect based on the movement information of the haptic providing module.

According to various embodiments of the present disclosure, the instructions further include: detecting further movement of the haptic providing module, and switching from the selected haptic actuator to at least one another haptic actuator based on at least one attribute of the at least one haptic event and movement information indicating the detected further movement of the haptic providing module.

According to various embodiments of the present disclosure, the instructions further comprise: altering a parameter of the selected at least one haptic actuator corresponding to the attribute of the haptic event based on the movement of the haptic providing module when further movement of the haptic providing module is detected.

According to various embodiments of the present disclosure, the electronic device is at least partially disposed on an apparatus wearable on a head of a user.

Figure 5:
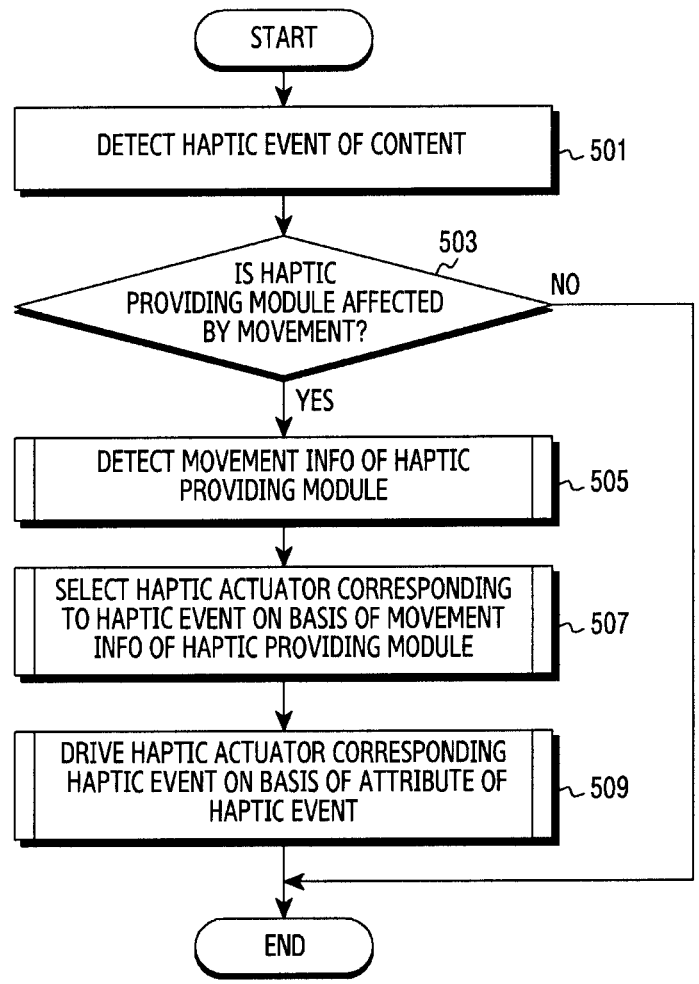
FIG. 5 is a flowchart illustrating a process for driving a haptic actuator corresponding to an attribute of a haptic event in an electronic device according to various embodiments of the present disclosure.

FIG. 5 is a flowchart illustrating a process for driving a haptic actuator corresponding to an attribute of a haptic event in an electronic device according to various embodiments of the present disclosure. In the following description, the electronic device may include the electronic device 201 of FIG. 2A or at least a part (e.g., the processor 220) of the electronic device 201.

Referring to FIG. 5, in operation 501, the electronic device may detect a haptic event related to a content (e.g., virtual reality content) being played in the electronic device. For example, the processor 220 may render an image and a sound of content for output by the electronic device 201. The processor 220 may detect whether the rendered image or sound corresponds to the haptic event. For example, when the processor 220 renders content to be output by the electronic device 201, the processor 220 may identify a pre-configured haptic event information included in the rendered content.

In operation 503, the electronic device may determine whether a haptic providing module is affected by a detected movement. For example, when the processor 220 detects that a haptic event related to the content output by the electronic device 201, the processor 220 may determine whether the haptic event should be affected or otherwise altered by the movement of a user's head, based on an attribute of the haptic event. When the haptic event is affected by the movement of the user's head, the processor 220 may determine whether the haptic event is affected by the movement of the haptic providing module 290 (or the haptic providing module 292) electrically connected to the electronic device 201. Specifically, the processor 220 may determine whether the haptic event is affected by the movement of the haptic providing module 290 electrically connected to the electronic device 201, based on characteristic information of the haptic providing module 290 which is stored in the memory 230. For example, when at least one haptic actuator included in the haptic providing module 290 is electrically connected to the electronic device 201, the memory 230 may collect and store characteristic information of the at least one haptic actuator. When an apparatus mountable on the user's head includes the haptic providing module 292 electrically connected to the electronic device 201, the processor 220 may determine that the haptic providing module 292 is affected by the movement of the user's head. For example, the apparatus mountable on the user's head may include the electronic device 201 or an HMD apparatus having the electronic device 201 mounted thereto.

When the haptic providing module is affected by the movement of the user's head, in operation 505, the electronic device may detect movement information of the haptic providing module. For example, the haptic providing module 290 may include at least one haptic actuator (e.g., the haptic actuator 140 of FIG. 1) arranged in different areas of the apparatus mountable on the user's head.

In operation 507, the electronic device may select at least one haptic actuator corresponding to the attribute of the haptic event, in the haptic providing module based on the movement information of the haptic providing module. For example, the processor 220 may select at least one haptic actuator arranged in a haptic occurrence direction included in the attribute of the haptic event based on the movement information of the haptic providing module. For example, the attribute of the haptic event may include at least one of the direction, strength, and type of the haptic event.

In operation 509, the electronic device may drive at least one haptic actuator corresponding to the attribute of the haptic event. For example, the processor 220 may generate a signal controlling at least one haptic actuator corresponding to the attribute of the haptic event, based on the attribute of the haptic event. For example, a haptic signal may include a driving parameter of a haptic actuator configured based on an attribute of a haptic event and movement information of the haptic actuator. The driving parameter may include at least one of a direction, strength, and pattern of a haptic effect for driving the haptic actuator. Herein, the direction of the haptic effect indicates a direction relative to an axis about which the user's head rotates.

Figure 6:
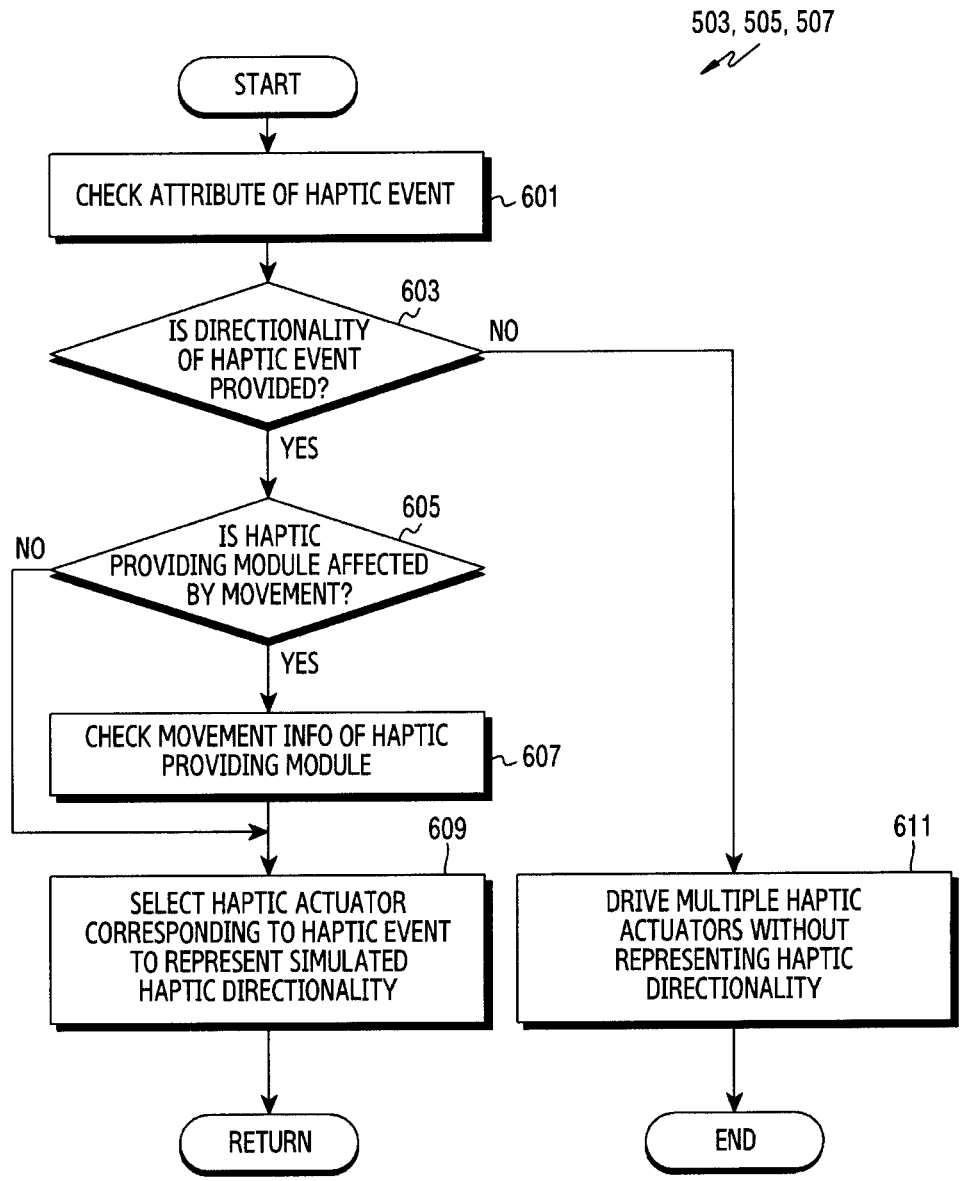
FIG. 6 is a flowchart illustrating a process for selecting a haptic actuator corresponding to an attribute of a haptic event in an electronic device according to various embodiments of the present disclosure.
Figure 8:
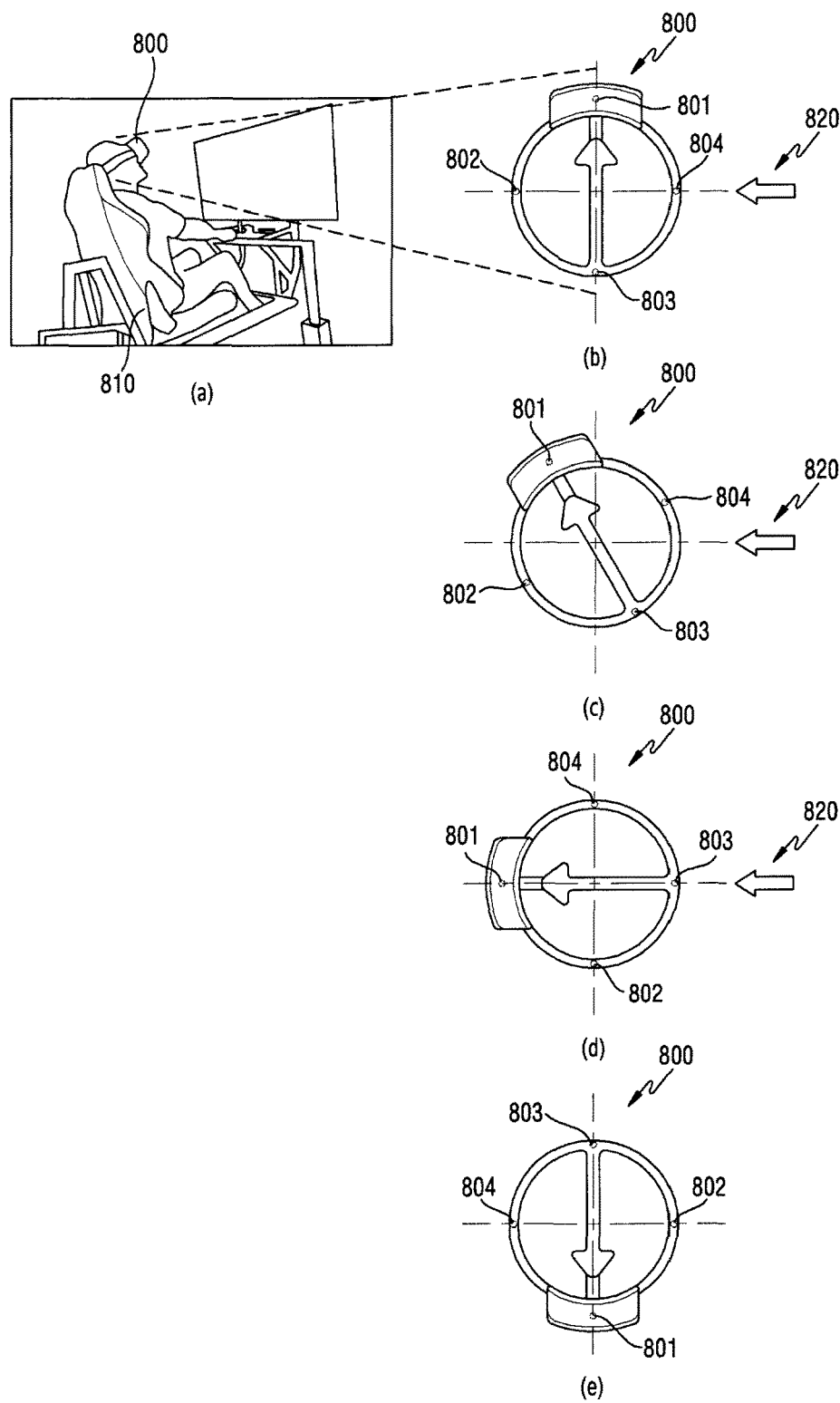
FIG. 8 is a view illustrating a movement state of a haptic actuator according to various embodiments of the present disclosure.

FIG. 6 is a flowchart illustrating a process for selecting a haptic actuator corresponding to an attribute of a haptic event in an electronic device according to various embodiments of the present disclosure. FIG. 8 is a view illustrating a movement state of a haptic actuator according to various embodiments of the present disclosure. Hereinafter, operations of selecting a haptic actuator corresponding to an attribute of a haptic event in operations 503 to 507 of FIG. 5 will be described. In the following description, the electronic device may include the electronic device 201 of FIG. 2A or at least a part (e.g., the processor 220) of the electronic device 201.

Referring to FIG. 6, in operation 601, when the electronic device detects a haptic event related to content being played in the electronic device (e.g., operation 501 of FIG. 5), the electronic device may identify an attribute of the detected haptic event. For example, an attribute of a haptic event may include at least one of the direction, strength, and type of the haptic event to be generated.

In operation 603, the electronic device may determine whether the haptic event is affected by the movement of the haptic providing module, based on the attribute of the haptic event. For example, the processor 220 may detect, from virtual reality content, haptic event 1 shown in Table 2 below representing the occurrence of a collision.

TABLE 2

| Haptic event 1 | |
| --- | --- |
| Category | collision |
| Direction | 6S14E |
| Force | 100 g/m² |

According to an embodiment of the present disclosure, from Table 2, the processor 220 may identify an event type of "collision" representing haptic event 1, direction information (e.g., 6S14E) of the occurrence of the collision, and strength information (e.g., 100 g/m²) of the collision. In this case, an attribute of haptic event 1 has directionality, and thus, the processor 220 may determine that haptic event 1 has been affected by the movement of the haptic providing module.

For example, the processor 220 may detect, from virtual reality content, haptic event 2 shown in Table 3 below representing the occurrence of a collision.

TABLE 3

| Haptic event 2 | |
| --- | --- |
| Category | road |
| Direction | none |
| Device | vehicle |
| Force | 50 g/m² |

According to an embodiment of the present disclosure, from Table 3, the processor 220 may identify an event type of "road surface" representing haptic event 2 and strength information (e.g., 50 g/m²) of the haptic event not having directionality. In this case, an attribute of haptic event 2 does not have directionality, and thus, the processor 220 may determine that haptic event 2 is not affected by the movement of the haptic providing module.

When it is determined that the haptic event is not affected by the movement of the haptic providing module, in operation 611, the electronic device may drive the haptic providing module, which is electrically connected to the electronic device, based on the attribute of the haptic event. For example, when the processor 220 detects haptic event 2 shown in Table 3, the processor 220 may simultaneously drive at least one haptic actuator included in the haptic providing module 290 to correspond to a haptic strength included in the attribute of the haptic event, and thereby reproduce a haptic effect (e.g., rattling on the road) corresponding to haptic event 2. That is, in a case where it is determined that the haptic event is not affected by the movement of the haptic providing module, even when the haptic providing module 290 is capable of representing directionality, the processor 220 may simultaneously drive multiple haptic actuators included in the haptic providing module 290, and thereby may reproduce a haptic effect corresponding to the attribute of the haptic event.

When it is determined that the haptic event is affected by the movement of the haptic providing module, in operation 605, the electronic device may determine whether the haptic providing module electrically connected to the electronic device is affected by a movement. For example, the processor 220 may identify whether the haptic providing module 290 electrically connected to the electronic device 201 is movable, based on characteristic information of the haptic providing module which is stored in the memory 230. For example, the movement of the haptic providing module 290 may be determined based on the type (e.g., an apparatus mountable on a head) of an apparatus having the haptic providing module 290 disposed therein. Specifically, when the haptic providing module 290 is included in an apparatus 800 mountable on a head as illustrated in (a) of FIG. 8, the processor 220 may determine that the haptic providing module 290 is affected by the movement of a user's head. When the haptic providing module 290 is included in a chair 810, the processor 220 may determine that the haptic providing module 290 is not affected by the movement of the user's head.

When it is determined that the haptic providing module electrically connected to the electronic device is not affected by the movement, in operation 609, the electronic device may select a haptic actuator corresponding to the haptic event based on the attribute of the haptic event. For example, when it is determined that the haptic providing module 290 is not affected by the movement, the processor 220 may determine that the location of a haptic actuator included in the haptic providing module 290 is fixed. Accordingly, the processor 220 may select at least one haptic actuator, which corresponds to an occurrence direction of the haptic event, among at least one haptic actuator included in the haptic providing module 290.

When it is determined that the haptic providing module electrically connected to the electronic device is affected by the movement, in operation 607, the electronic device may identify movement information of the haptic providing module. For example, when the haptic providing module 290 is included in the apparatus 800 mountable on a head, the processor 220 may detect the movement of the user's head through the sensor module 280. The processor 220 may identify movement information of the haptic providing module 290 based on the movement of the user's head. For example, the movement information of the haptic providing module 290 may include location information of a haptic actuator corresponding to the movement of the user's head.

In operation 609, the electronic device may select a haptic actuator corresponding to the haptic event based on the attribute of the haptic event and the movement information of the haptic providing module. For example, when the processor 220 detects a simulated collision event occurring on the right of the user in a state where the user's head faces the front as illustrated in (b) of FIG. 8, the processor 220 may select the haptic actuator 4 804 disposed on the right of the user among haptic actuators 801, 802, 803, and 804. For example, when the processor 220 detects a collision event occurring on the right of the user in a state where the user's head moves to the left at a first angle (e.g., 30 degrees) as illustrated in (c) of FIG. 8, the processor 220 may select the haptic actuator 3 803 and the haptic actuator 4 804 adjacently arranged on the right of the user among the haptic actuators 801, 802, 803, and 804. For example, when the processor 220 detects a collision event occurring on the right of the user in a state where the user's head moves to the left at a second angle (e.g., 90 degrees) as illustrated in (d) of FIG. 8, the processor 220 may select the haptic actuator 3 803 disposed on the right of the user among the haptic actuators 801, 802, 803, and 804.

According to an embodiment of the present disclosure, when a movement range (e.g., angle) of the user's head detected by the electronic device exceeds a reference range (e.g., 90 degrees), the electronic device may determine that the user having the electronic device mounted on the user's head has turned back. For example, when the user has rotated his/her head in a range (e.g., 180 degrees) exceeding the reference range (e.g., 90 degrees) as illustrated in (e) of FIG. 8, the processor 220 may determine that the user of the electronic device 201 has turned back. In this case, the processor 220 may update the direction of a haptic event configured with reference to the user.

Figure 7:
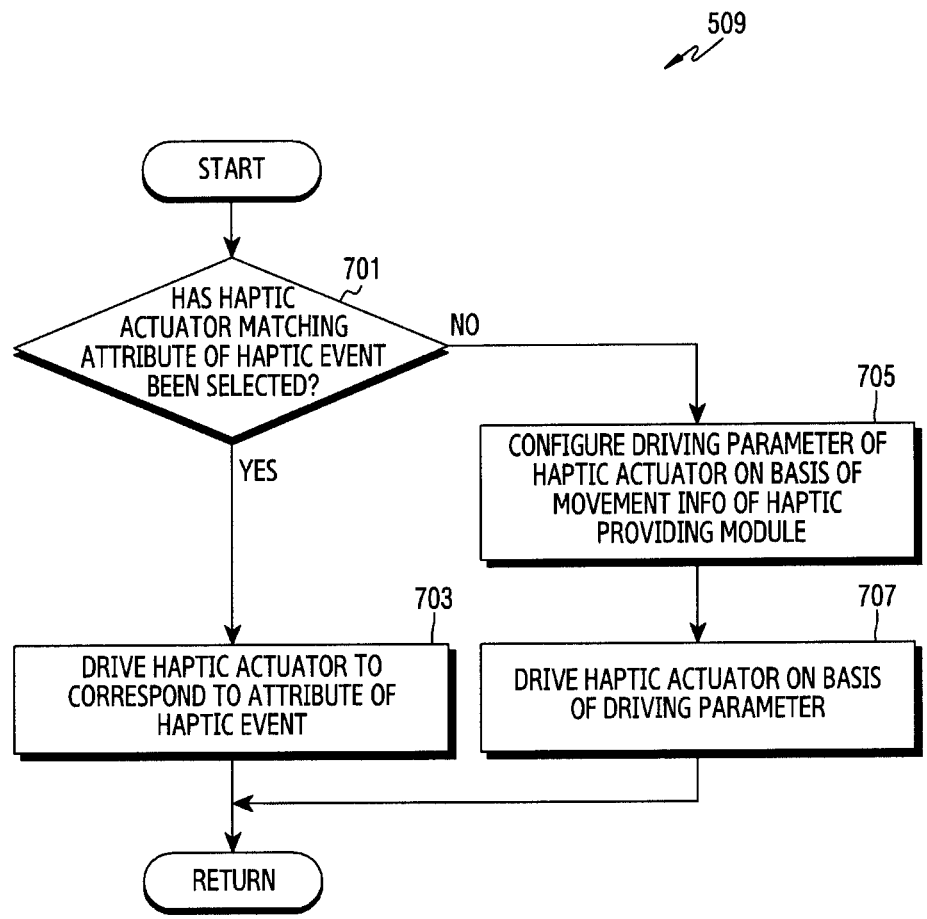
FIG. 7 is a flowchart illustrating a process for driving a haptic actuator based on movement information in an electronic device according to various embodiments of the present disclosure.

FIG. 7 is a flowchart illustrating a process for driving a haptic actuator based on movement information in an electronic device according to various embodiments of the present disclosure. Hereinafter, an operation of driving a haptic actuator corresponding to a haptic event in operation 509 of FIG. 5 will be described. In the following description, the electronic device may include the electronic device 201 of FIG. 2A or at least a part (e.g., the processor 220) of the electronic device 201.

Referring to FIG. 7, in operation 701, when a haptic actuator is selected (e.g., operation 507 of FIG. 5), the electronic device may determine whether the selected haptic actuator matches the attribute of the haptic event. For example, the processor 220 may determine whether a haptic occurrence direction included in the attribute of the haptic event matches the location of the selected haptic actuator.

When the selected haptic actuator matches the attribute of the haptic event, then in operation 703, the electronic device may drive the selected haptic actuator in accordance with the attribute of the haptic event. For example, the processor 220 may select the haptic actuator 4 804 disposed at a location (e.g., the right side) matching an occurrence direction 820 (e.g., the right side) of the haptic event as illustrated in (b) of FIG. 8. In this case, the processor 220 may configure a driving parameter for driving the haptic actuator 4 804 so as to correspond to the attribute (e.g., a direction and a strength) of the haptic event. The processor 220 may transmit, to the haptic actuator 4 804, a control signal (e.g., a haptic signal) including a driving parameter configured based on the attribute of the haptic event. For example, the haptic actuator 4 804 may be activated based on the control signal received from the electronic device 201. The haptic actuator 4 804 may be driven to correspond to the driving parameter included in the control signal, so that a haptic effect can be reproduced.

When the selected haptic actuator does not match the attribute of the haptic event is selected, in operation 705, the electronic device may configure a driving parameter of the selected haptic actuator based on movement information of the haptic providing module. For example, the processor 220 may select the haptic actuator 2 802 and the haptic actuator 4 804 which are arranged at a location, despite the fact that haptic actuator 2 802 and haptic actuator 4 804 do not match a haptic occurrence direction (e.g., the right side) included in the attribute of the haptic event as illustrated in (c) of FIG. 8. The processor 220 may configure a driving attribute of the haptic actuator 2 802 based on a difference between the occurrence direction (e.g., the right side) of the haptic event and the location (e.g., movement information) of the haptic actuator 2 802. The processor 220 may configure a driving attribute of the haptic actuator 4 804 based on a difference between the occurrence direction (e.g., the right side) of the haptic event and the location of the haptic actuator 4 804. Specifically, the processor 220 may update a driving attribute (e.g., a driving direction and strength) of the haptic actuator corresponding to the attribute of the haptic event so as to correspond to the location of the haptic actuator 2 802 or the haptic actuator 4 804.

In operation 707, the electronic device may drive the haptic actuator using the driving parameter of the haptic actuator configured in accordance with the movement information of the haptic providing module. For example, the processor 220 may transmit, to the haptic actuator 2 802 and the haptic actuator 4 804, a control signal (a haptic signal) including the driving parameter configured based on the attribute of the haptic event and the movement information of the haptic providing module 290. For example, each of the haptic actuator 2 802 and the haptic actuator 4 804 may be driven to correspond to the driving parameter included in the control signal, so that a haptic effect can be reproduced.

Figure 9:
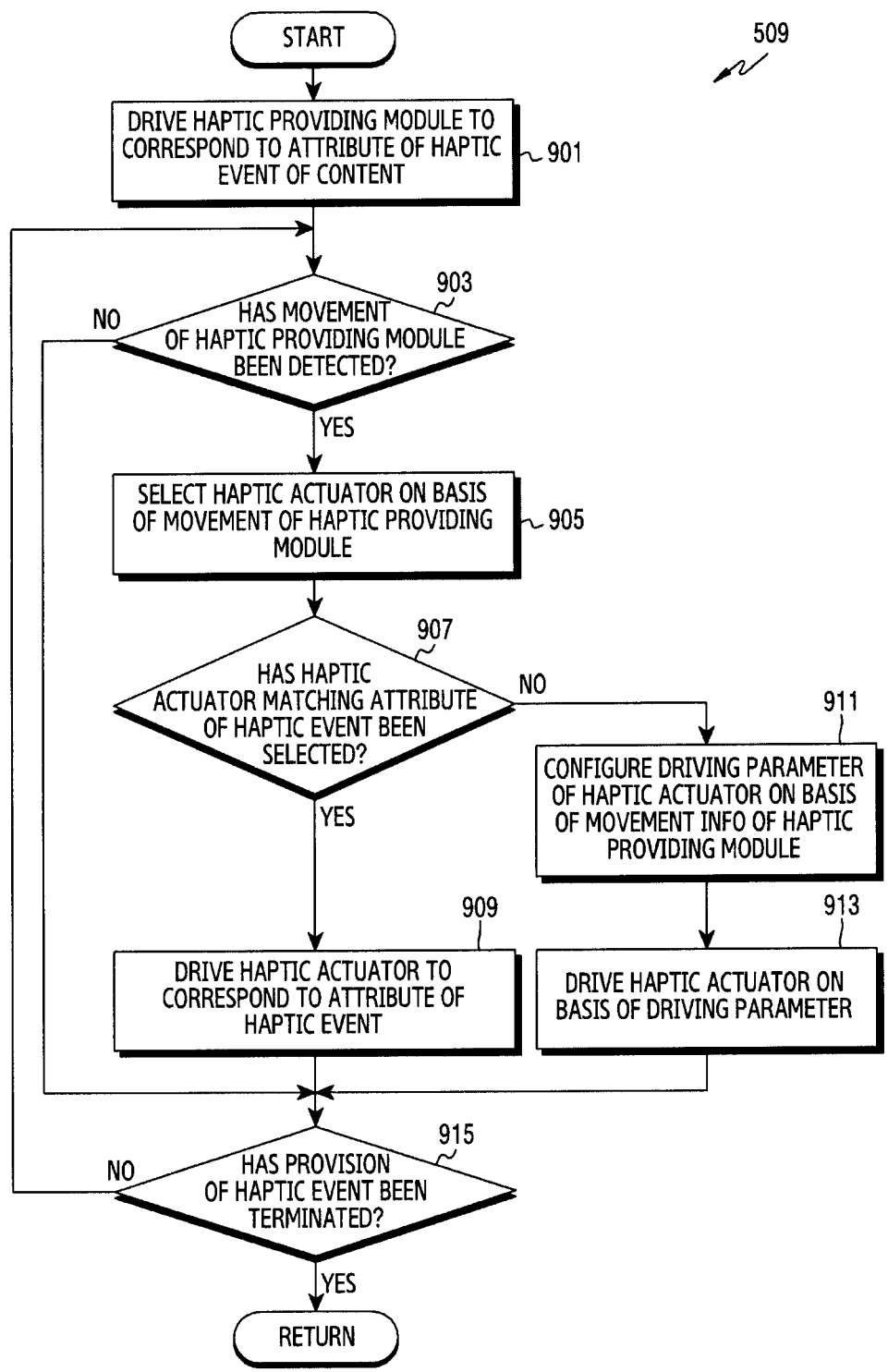
FIG. 9 is a flowchart illustrating a process for changing a haptic actuator corresponding to an attribute of a haptic event based on movement information in an electronic device according to various embodiments of the present disclosure.

FIG. 9 is a flowchart illustrating a process for changing a haptic actuator corresponding to an attribute of a haptic event based on movement information in an electronic device according to various embodiments of the present disclosure. Hereinafter, an operation of driving a haptic actuator corresponding to a haptic event in operation 509 of FIG. 5 will be described. In the following description, the electronic device may include the electronic device 201 of FIG. 2A or at least a part (e.g., the processor 220) of the electronic device 201.

Referring to FIG. 9, in operation 901, the electronic device may drive a haptic providing module to correspond to an attribute of a haptic event of content. For example, the processor 220 may control a haptic actuator corresponding to a haptic event so as to provide a haptic effect based on an attribute of the haptic event, and movement information of the haptic actuator corresponding to the haptic event.

In operation 903, the electronic device may determine whether movement of the haptic providing module is detected while driving of the haptic providing module. For example, through the sensor module 280 of the electronic device 201, the processor 220 may determine whether the movement of the electronic device 201 via movement of a user's head is detected.

When the movement of the haptic providing module is not detected, then in operation 915, the electronic device may determine whether the provision of the haptic event has been terminated.

When the movement of the haptic providing module is detected, in operation 905, the electronic device may select a haptic actuator corresponding to the haptic event to correspond to the movement of the haptic providing module. For example, the processor 220 may change from a first haptic actuator currently being driven to another haptic actuator, or maintain the haptic actuator being driven without any change based on movement of the haptic providing module.

In operation 907, the electronic device may determine whether a haptic actuator matching the attribute of the haptic event has been selected. For example, the processor 220 may determine whether the location of the haptic actuator selected in operation 905 matches an occurrence direction of the haptic event.

When the haptic actuator matches the attribute (e.g., an occurrence direction of the haptic event) of the haptic event, in operation 909, the electronic device may drive the selected haptic actuator corresponding to the haptic event to correspond to the attribute thereof. For example, when a collision event occurs on the right of the user in a state where the user gaze is oriented forward or straight ahead, as illustrated in (b) of FIG. 8, the processor 220 may operate the haptic actuator 4 804 disposed on the right of the user so as to correspond to the strength of the collision event. When the user rotates his/her head to the left at 90 degrees as illustrated in (d) of FIG. 8, the processor 220 may drive the haptic actuator 3 803 disposed on the right of the user so as to correspond to the strength of the collision event. That is, the processor 220 may change a haptic actuator corresponding to the collision event based on the movement of the haptic actuator.

When a haptic actuator which does not match the attribute of the haptic event is selected, then in operation 911, the electronic device may configure a driving parameter of the haptic actuator based on movement information of the haptic providing module, and the attribute of the haptic event. For example, the processor 220 may drive the haptic actuator 4 804 disposed on the right of the user to correspond to the strength of a collision event based on the collision event having occurred on the right of the user as illustrated in (b) of FIG. 8. When the user rotates his/her head to the left at 30 degrees as illustrated in (c) of FIG. 8, the processor 220 may select the haptic actuator 3 803 and the haptic actuator 4 804, which are adjacent to the right of the user, as haptic actuators corresponding to the collision event. In this case, the processor 220 may configure a driving attribute of each of the haptic actuator 3 803 and the haptic actuator 4 804 based on a difference between an occurrence direction (e.g., the right side) of the collision event and the locations of the haptic actuator 3 803 and the haptic actuator 4 804 according to the movement of the haptic providing module.

In operation 913, the electronic device may drive at least one haptic actuator corresponding to the haptic event based on the driving parameter of the haptic actuator configured based on the movement information of the haptic providing module. For example, in the case of (c) of FIG. 8, the processor 220 may transmit, to the haptic actuator 3 803 and the haptic actuator 4 804, a control signal (a haptic signal) including the driving parameter configured based on the attribute of the haptic event and the movement information of the haptic providing module 290. That is, the processor 220 may change the haptic actuator corresponding to the haptic event (e.g., a collision event) based on the movement of the haptic actuator.

When at least one haptic actuator corresponding to the haptic event is driven, in operation 915, the electronic device may determine whether the provision of the haptic event has been terminated. For example, the processor 220 may determine whether the reproduction of content by the electronic device 201 has been terminated. For example, the processor 220 may determine whether a reproduction time point of the haptic event detected from content being reproduced by the electronic device 201 has been terminated.

Figure 10:
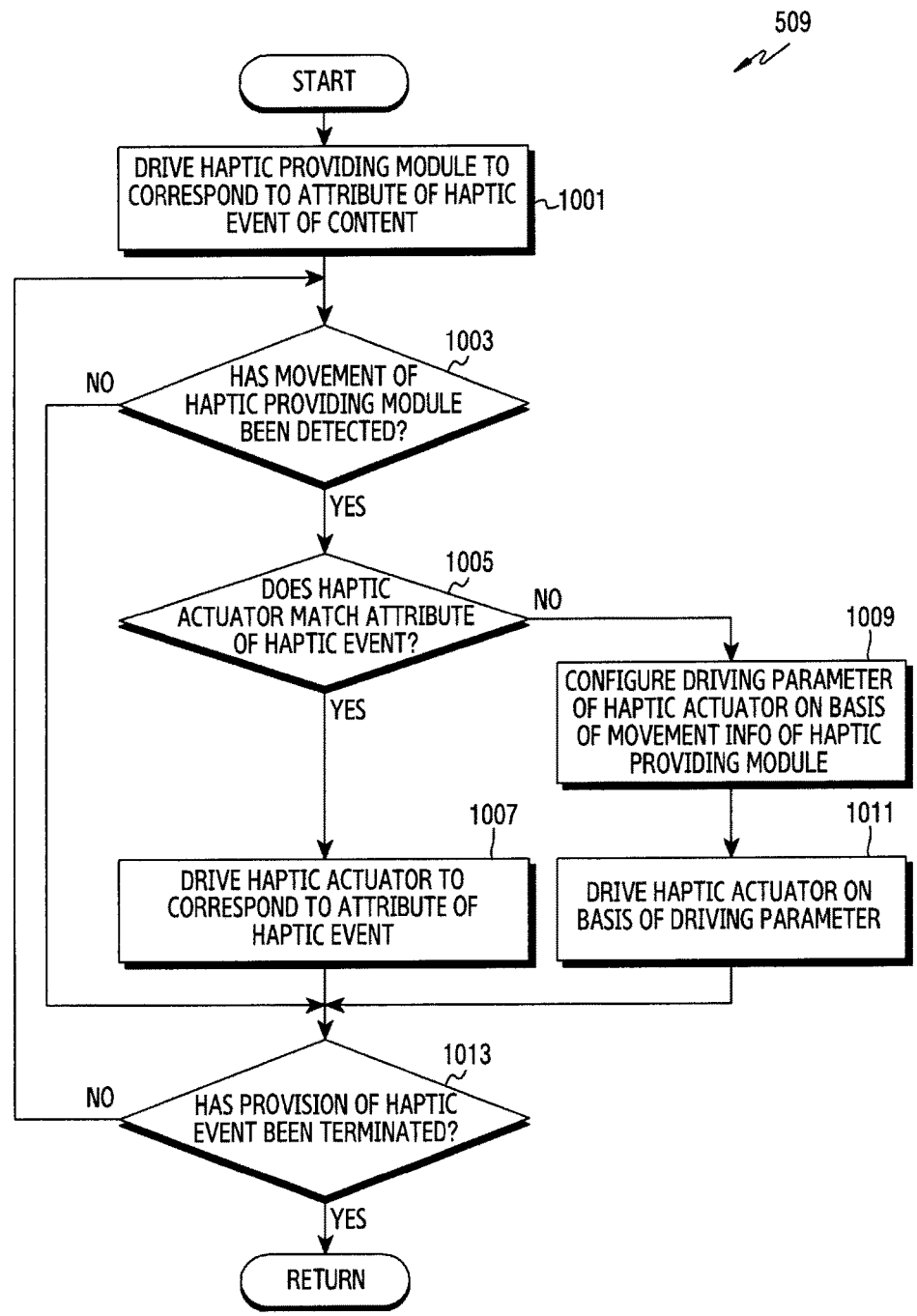
FIG. 10 is a flowchart illustrating a process for controlling the driving of a haptic actuator based on movement information in an electronic device according to various embodiments of the present disclosure.

FIG. 10 is a flowchart illustrating a process for controlling the driving of a haptic actuator based on movement information in an electronic device according to various embodiments of the present disclosure. Hereinafter, an operation of driving a haptic actuator corresponding to a haptic event in operation 509 of FIG. 5 will be described. In the following description, the electronic device may include the electronic device 201 of FIG. 2A or at least a part (e.g., the processor 220) of the electronic device 201.

Referring to FIG. 10, in operation 1001, the electronic device may drive the haptic providing module to correspond to an attribute of a haptic event of content. For example, when a collision event occurs on the right of the user in a state where the user gaze is oriented forward or straight ahead as illustrated in (b) of FIG. 8, the processor 220 may select the haptic actuator 4 804, which is disposed on the right of the user, as a haptic actuator corresponding to the collision event. The processor 220 may transmit, to the haptic actuator 4 804, a haptic signal (a control signal) including a driving parameter corresponding to the strength and direction of the collision event, and thereby may control driving of the haptic actuator 4 804.

In operation 1003, the electronic device may determine whether the movement of the haptic providing module has been detected during driving of the haptic providing module corresponding to the haptic event. For example, the processor 220 may determine whether the movement of the head of the user of the electronic device 201 has been detected, through the sensor module 280 of the electronic device 201.

When the movement of the haptic providing module is not detected, in operation 1013, the electronic device may determine whether the provision of the haptic event has been terminated.

When the movement of the haptic providing module is detected, in operation 1005, the electronic device may determine whether a haptic actuator corresponding to the haptic event matches the attribute (e.g., a direction of the haptic event) of the haptic event, based on the movement of the haptic providing module. For example, the processor 220 may determine whether a changed location of the haptic actuator driven in operation 1001 coincides with an occurrence direction of the haptic event by comparing the changed location of the haptic actuator with the occurrence direction of the haptic event.

When the haptic actuator corresponding to the haptic event matches the attribute of the haptic event, in operation 1007, the electronic device may drive at least one haptic actuator corresponding to the haptic event so as to correspond to the attribute of the haptic event. For example, the processor 220 may generate a driving parameter of the haptic actuator based on the occurrence direction and strength of the haptic event. The processor 220 may transmit, to the haptic actuator, a haptic signal (a control signal) including the driving parameter of the relevant haptic actuator. The haptic actuator corresponding to the haptic event may be driven based on the driving parameter included in the haptic signal.

When the haptic actuator corresponding to the haptic event does not match the attribute of the haptic event, in operation 1009, the electronic device may configure a driving parameter of the haptic actuator corresponding to the haptic event based on movement information of the haptic providing module and the attribute of the haptic event. For example, the processor 220 may configure the driving direction and strength of the haptic actuator for generating a haptic effect based on a difference between the occurrence direction of the haptic event and the location of the haptic actuator. That is, the processor 220 may adjust the direction and strength of a haptic effect to be reproduced through the haptic actuator, based on a difference between the occurrence direction of the haptic event and the location of the haptic actuator.

In operation 1011, the electronic device may drive at least one haptic actuator corresponding to the haptic event based on the driving parameter of the haptic actuator corresponding to the movement information of the haptic providing module and the attribute of the haptic event. For example, the processor 220 may transmit, to the haptic actuator corresponding to the haptic event, the driving parameter of the haptic actuator configured based on a difference between the occurrence direction of the haptic event and the location of the haptic actuator. The haptic actuator may reproduce a haptic effect based on the driving parameter received from the electronic device.

In operation 1013, when at least one haptic actuator corresponding to the haptic event is driven, the electronic device may determine whether the provision of the haptic event has been terminated. For example, the processor 220 may determine whether a reproduction time point of the content or haptic event has been terminated in the electronic device 201.

According to various embodiments of the present disclosure, an operating method of an electronic device may include: detecting at least one haptic event related to content being played by the electronic device; detecting movement information of a haptic providing module electrically connected to the electronic device; and selecting at least one haptic actuator among one or more haptic actuators included in the haptic providing module, based on at least one of attribute of the detected at least one haptic event and the detected movement information of the haptic providing module.

According to various embodiments of the present disclosure, the haptic providing module including the one or more haptic actuators are disposed in an apparatus wearable on a head of a user.

According to various embodiments of the present disclosure, the apparatus include a Head-Mounted Display (HMD).

According to various embodiments of the present disclosure, the detecting the movement information comprises: detecting whether detection of the movement information of the haptic providing module is required, based on at least one of the attribute of the haptic event and a determination as to whether the haptic providing module is movable; and detecting the movement information when the movement information of the haptic providing module is determined to be required.

According to various embodiments of the present disclosure, the detecting the movement information of the haptic providing module may include detecting the movement information of the haptic providing module based on movement information, which is detected via the at least one sensor, of an apparatus wearable on a head of a user.

According to various embodiments of the present disclosure, the operating method may further include: detecting a difference between a location corresponding to a haptic occurrence direction indicated by the attribute of the haptic event and a location of the selected at least one haptic actuator; and controlling driving of the selected at least one haptic actuator based on the difference between the haptic occurrence direction and the location.

According to various embodiments of the present disclosure, the controlling of the driving of the at least one haptic actuator may include changing at least one of a direction of the haptic effect, a pattern of the haptic effect, a strength of the haptic effect based on the movement information of the haptic providing module.

According to various embodiments of the present disclosure, the operating method may further include detecting further movement of the haptic providing module, and switching from the selected haptic actuator to at least one another haptic actuator based on at least one attribute of the at least one haptic event and movement information indicating the detected further movement of the haptic providing module.

According to various embodiments of the present disclosure, the operating method may further include altering a parameter of the selected at least one haptic actuator corresponding to the attribute of the haptic event based on the movement of the haptic providing module, when further movement of the haptic providing module is detected.

According to various embodiments of the present disclosure, the haptic providing module is disposed in an apparatus wearable on a user's head, and wherein the at least one attribute of the haptic event comprises at least one of: a direction of a haptic effect, a strength of the haptic effect, and a type of the haptic effect.

The electronic device and the operating method thereof according to various embodiments of the present disclosure can drive at least one haptic actuator corresponding to an attribute of a haptic event acquired from virtual reality content based on movement information of at least one haptic actuator which is included in at least a part of an apparatus wearable on a user's head and is affected by the movement of the user's head. Therefore, the sense of reality of virtual reality experienced by a user of the electronic device can be improved.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a program module form. The instruction, when executed by a processor (e.g., the processor 220), may cause the one or more processors to execute the function corresponding to the instruction. The computer-readable storage medium may be, for example, the memory 230.

The computer readable recoding medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

The embodiments disclosed herein are provided merely to easily describe technical details of the present disclosure and to help the understanding of the present disclosure, and are not intended to limit the scope of various embodiments of the present disclosure. Therefore, it should be construed that all modifications and changes or various other embodiments based on the technical idea of various embodiments of the present disclosure fall within the scope of various embodiments of the present disclosure.

What is claimed is:

1. An electronic device comprising:
   at least one sensor;
   at least one processor; and
   a memory electrically coupled to the at least one processor, storing instructions executable by the at least one processor to cause the at least one processor to:
   detect at least one haptic event related to multimedia content output by the electronic device,
   detect movement information indicating movement of a haptic providing module electrically coupled to the electronic device based on a movement of a head of a user, via the at least one sensor, wherein the haptic providing module is disposed in a Head-Mounted Display (HMD) worn on the head of the user and includes one or more haptic actuators,
   identify at least one haptic actuator of the one or more haptic actuators based on at least one attribute of the at least one haptic event including one or more of a direction, strength and type of the at least one haptic event, and in response to the detected movement information, and
   drive the identified at least one haptic actuator to output a haptic effect to the user through the HMD representing the at least one haptic event related to the outputted multimedia content.

2. The electronic device as claimed in claim 1, wherein the instructions are further executable by the at least one processor to:
   detect whether detection of the movement information of the haptic providing module is required, based on at least one of the at least one attribute of the haptic event and a determination as to whether the haptic providing module is movable; and
   detect the movement information when the movement information of the haptic providing module is determined to be required.

3. The electronic device as claimed in claim 1, wherein the instructions are further executable by the at least one processor to:
   detect the movement information of the haptic providing module based on movement information, which is detected via the at least one sensor, of the HMD.

4. The electronic device as claimed in claim 1, wherein the instructions are further executable by the at least one processor to:
   detect a difference between a haptic occurrence direction indicated by the at least one attribute of the haptic event and a location of the identified at least one haptic actuator; and
   control driving of the identified at least one haptic actuator based on the difference between the haptic occurrence direction and the location.

5. The electronic device as claimed in claim 4, wherein controlling driving of the identified at least one haptic actuator further comprises:
   changing at least one of a direction of a haptic effect of the haptic event, a pattern of the haptic effect, a strength of the haptic effect based on the movement information of the haptic providing module.

6. The electronic device as claimed in claim 1, wherein the instructions are further executable by the at least one processor to:
   detect further movement of the haptic providing module; and
   switch from the identified at least one haptic actuator to at least one another haptic actuator based on the at least one attribute of the at least one haptic event and movement information indicating the detected further movement of the haptic providing module.

7. The electronic device as claimed in claim 1, wherein the instructions are further executable by the at least one processor to:
   alter a parameter of the identified at least one haptic actuator corresponding to the at least one attribute of the haptic event based on the movement of the haptic providing module when further movement of the haptic providing module is detected.

8. The electronic device as claimed in claim 1, wherein the electronic device is at least partially disposed on the HMD.

9. An operating method of an electronic device, comprising:
   detecting at least one haptic event related to multimedia content output by the electronic device;
   detecting, by at least one sensor, movement information indicating movement of a haptic providing module electrically coupled to the electronic device based on a movement of a head of a user, wherein the haptic providing module is disposed in a Head-Mounted Display (HMD) worn on the head of the user and including one or more haptic actuators; and
   identifying at least one haptic actuator of the one or more haptic actuators based on at least one attribute of the detected at least one haptic event including one or more of a direction, strength and type of the at least one haptic event, and in response to the detected movement information, and
   driving the identified at least one haptic actuator to output a haptic effect to the user through the HMD representing the at least one haptic event related to the outputted multimedia content.

10. The operating method as claimed in claim 9, wherein the detecting of the movement information comprises:
    detecting whether detection of the movement information of the haptic providing module is required, based on at least one of the at least one attribute of the haptic event and a determination as to whether the haptic providing module is movable; and
    detecting the movement information when the movement information of the haptic providing module is determined to be required.

11. The operating method as claimed in claim 9, wherein the detecting of the movement information comprises:
    detecting the movement information of the haptic providing module based on movement information, which is detected via the at least one sensor, of the HMD.

12. The operating method as claimed in claim 9, further comprising:
    detecting a difference between a haptic occurrence direction indicated by the at least one attribute of the haptic event and a location of the identified at least one haptic actuator; and
    controlling driving of the identified at least one haptic actuator based on the difference between the haptic occurrence direction and the location.

13. The operating method as claimed in claim 12, wherein controlling of driving of the identified at least one haptic actuator further comprises:
    changing at least one of a direction of a haptic effect of the haptic event, a pattern of the haptic effect, a strength of the haptic effect based on the movement information of the haptic providing module.

14. The operating method as claimed in claim 9, further comprising:
    detecting further movement of the haptic providing module; and
    switching from the identified at least one haptic actuator to at least one another haptic actuator based on at least one attribute of the at least one haptic event and movement information indicating the detected further movement of the haptic providing module.

15. The operating method as claimed in claim 9, further comprising:
    altering a parameter of the identified at least one haptic actuator corresponding to the at least one attribute of the haptic event based on the movement of the haptic providing module, when further movement of the haptic providing module is detected.

16. The operating method as claimed in claim 9, wherein the haptic providing module is disposed in an apparatus wearable on a user's head, and
    wherein the at least one attribute of the haptic event comprises at least one of: a direction of a haptic effect of the haptic event, a strength of the haptic event, and a type of the haptic event.

* * * * *